United States Patent
Furukawa et al.

(10) Patent No.: US 7,382,382 B2
(45) Date of Patent: Jun. 3, 2008

(54) DISPLAY DEVICE CONVERSION DEVICE, DISPLAY DEVICE CORRECTION CIRCUIT, DISPLAY DEVICE DRIVING DEVICE, DISPLAY DEVICE, DISPLAY DEVICE EXAMINATION DEVICE, AND DISPLAY METHOD

(75) Inventors: Hiroyuki Furukawa, Ueno (JP); Yasuhiro Yoshida, Nara (JP); Masafumi Ueno, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 529 days.

(21) Appl. No.: 10/740,795

(22) Filed: Dec. 22, 2003

(65) Prior Publication Data

US 2004/0150602 A1 Aug. 5, 2004

(30) Foreign Application Priority Data

Dec. 27, 2002 (JP) ............................. 2002-381486

(51) Int. Cl.
*G09G 5/10* (2006.01)
*G09G 3/36* (2006.01)

(52) U.S. Cl. ................. 345/690; 345/88; 345/589; 348/254; 348/674; 358/519; 358/523; 382/274; 382/299

(58) Field of Classification Search ............ 345/87–90, 345/204–207, 596, 600, 690, 214; 348/254, 348/671, 674; 382/274, 300, 299; 358/448, 358/519, 523

See application file for complete search history.

(56) References Cited

U.S. PATENT DOCUMENTS 6,160,532 A * 12/2000 Kaburagi et al. ............. 345/87
6,342,898 B1 * 1/2002 Pettitt ....................... 345/601
6,370,265 B1   4/2002 Bell et al.
6,388,648 B1 * 5/2002 Clifton et al. ................ 345/88
6,462,735 B2 * 10/2002 Naito ........................ 345/204
6,856,704 B1 * 2/2005 Gallagher et al. ........... 382/263
6,995,753 B2 * 2/2006 Yamazaki et al. ............ 345/204
7,088,478 B2 * 8/2006 Shirochi et al. ............. 358/519
7,170,477 B2 * 1/2007 Okamoto et al. .............. 345/77

FOREIGN PATENT DOCUMENTS

JP        9-288468 A      11/1997
JP        11-296149 A     10/1999

* cited by examiner

*Primary Examiner*—Henry N Tran
(74) *Attorney, Agent, or Firm*—Birch, Stewart, Kolasch & Birch, LLP

(57) ABSTRACT

The liquid crystal display device inputs a signal, corrected by a correction circuit provided with a sigmoid inverse function generator, to a source driver. A sigmoid function which is an S-shaped function is used to approximate an input/output characteristic (applied voltage-transmittance curve) of a liquid crystal panel. The sigmoid inverse function generator converts an input signal by using an inverse function of the sigmoid function obtained by performing the approximation. A γ conversion circuit provided on the correction circuit and the sigmoid inverse function generator realize the desired γ characteristic regardless of a characteristic of the liquid crystal panel. Further, since the inverse function of the sigmoid function which is an S-shaped function is used, it is possible to provide a display device which corrects the input/output characteristic of the display panel by performing the approximation in accordance with not plural functions but a single function (without dividing the characteristic into sections).

4 Claims, 12 Drawing Sheets

DISPLAY DEVICE CONVERSION DEVICE, DISPLAY DEVICE CORRECTION CIRCUIT, DISPLAY DEVICE DRIVING DEVICE, DISPLAY DEVICE, DISPLAY DEVICE EXAMINATION DEVICE, AND DISPLAY METHOD

This Nonprovisional application claims priority under 35 U.S.C. § 119(a) on Patent Application No. 2002/381486 filed in Japan on Dec. 27, 2002, the entire contents of which are hereby incorporated by reference.

FIELD OF THE INVENTION

The present invention relates to a display device conversion device, a display device correction circuit, a display device driving device, a display device, a display device examination device, and a display method, by which an inputted video signal is converted. More specifically, the present invention relates to a display device conversion device, a display device correction circuit, a display device driving device, a display device, a display device examination device, and a display method, by which, for example, (i) correction is performed in accordance with an applied voltage-transmittance characteristic of liquid crystal, and (ii) $\gamma$ correction is performed so as to adjust a $\gamma$ characteristic indicative of a relationship between an imaging system and a display system, and (iii) gradation correction is performed so as to create a picture in accordance with display content.

BACKGROUND OF THE INVENTION

Among display devices each of which displays an image based on an inputted video signal, there is a display device which includes a correction circuit for correcting the inputted video signal. In the display device, the correction circuit performs desired correction with respect to the video signal, so as to cause a display panel to display an image based on the video signal.

Here, a liquid crystal display device, which is an example of the foregoing display device, includes a liquid crystal panel which is made of a liquid crystal layer sandwiched by glass substrates, and causes an electrode formed on the glass substrate to apply a voltage to the liquid crystal, thereby displaying the image based on the video signal. In the liquid crystal display device, an electro-optical effect is used so as to realize gradation display. For example, in a TFT (Thin Film Transistor) liquid crystal display device for driving in accordance with a general TN (Twisted Nematic) mode, a polarizing plate and a liquid crystal cell are combined with each other, so as to utilize liquid crystal's optical activity obtained by applying a voltage, thereby varying optical transmittance of the liquid crystal.

As exemplified in FIG. 12, a relationship between the applied voltage and the optical transmittance of the liquid crystal is represented not by a straight line, but by an S-shaped curve. Note that, this example shows a case of a normally black mode in which the transmittance increases as the applied voltage increases. However, also in a case of a normally white mode in which the transmittance adversely decreases as the applied voltage increases, the following description is applicable.

In a transmission type liquid crystal display device in which a light source is disposed on a back side, luminance of a display image is in proportion to the optical transmittance. In the transmission type liquid crystal display device, when an input level of a video signal is shifted to a liquid crystal driving voltage (applied voltage) so as to display an image, a relationship between the applied voltage and the optical transmittance corresponds to a relationship between the input level of the video signal and the luminance of the display image.

That is, in the liquid crystal display device, the relationship ($\gamma$ characteristic) between the input level of the video signal and the luminance of the display image is represented by an S-shaped curve as in the applied voltage-transmittance curve shown in FIG. 12.

Then, there is a case where the liquid crystal display device is provided with a correction circuit for correcting the $\gamma$ characteristic for example, so as to exactly display an image based on the inputted video signal.

Further, for example, a television provided with a CRT (Cathode Ray Tube) (hereinafter, the television is referred to as "CRT device") has a $\gamma$ characteristic completely different from the $\gamma$ characteristic of the aforementioned liquid crystal display. FIG. 13 shows an example of the $\gamma$ characteristic of the CRT device. According to FIG. 13, a normalized input level (V) and an output luminance (Y) are related with each other so as to have such an exponential $\gamma$ characteristic ($\gamma=2.2$) that $Y=V^{2.2}$. Thus, the CRT device is based on a condition under which: an imaging system generates a video signal at $1/\gamma$, and a display system performs $\gamma$ inversion.

Thus, the liquid crystal display device and the CRT device are different from each other in the output luminance even when the same video signal is inputted, so that a condition under which a halftone image is reproduced greatly differs depending on the difference in the $\gamma$ characteristic.

Then, in order to realize the display characteristic of the CRT device (in order to replace the CRT device), there is a case where the liquid crystal display device is provided with a correction circuit which realizes the $\gamma$ characteristic of $\gamma=2.2$. Thus, the luminance curve of the liquid crystal is corrected.

Examples of the foregoing liquid crystal display device are disclosed in Japanese Unexamined Patent Publication No. 288468/1997 (Tokukaihei 9-288468)(Publication date: Nov. 4, 1997) and Japanese Unexamined Patent Publication No. 296149/1999 (Tokukaihei 11-296149)(publication date: Oct. 29, 1999).

In these techniques, the applied voltage-transmittance characteristic (input/output characteristic) of the liquid crystal that is shown in FIG. 12 is approximated by a function expression, so as to correct the applied voltage-transmittance characteristic of the liquid crystal on the basis of the approximate expression. More specifically, in Tokukaihei 9-288468, an S-shaped curve indicative of an applied voltage-transmittance characteristic is approximated in accordance with three functions (the line indicative of the applied voltage-transmittance characteristic is divided into three sections in accordance with the voltage level, so as to approximate the sections by functions indicative of curves and a straight line). Further, in Tokukaihei 11-296149, an S-shaped curve indicative of an applied voltage-transmittance characteristic is approximated in accordance with five functions (the line indicative of the applied voltage-transmittance characteristic is divided into five sections in accordance with the voltage level, so as to approximate the sections by using different functions, thereby approximating an S-shaped curve).

However, these arrangements recited in the foregoing publications raise the following problem: since an S-shaped curve indicative of an applied voltage-transmittance characteristic is approximated in accordance with plural functions, the continuity of the plural functions and positions at which the plural functions are connected to each other may be determined, so that it takes trouble and time to perform calculation (since the input voltage is divided into sections so as to approximate the applied voltage-transmittance of the liquid crystal by functions, the continuity of the divisional points may be considered and the points at which the characteristic should be divided may be determined, so that it takes trouble and time to perform calculation).

That is, in the case of dividing the characteristic into sections so as to approximate the characteristic by functions like the foregoing publications, it is necessary to consider the continuity of the divisional points and it is necessary to determine the positions at which the curve should be divided, and it takes much trouble to perform such processes. Further, it is necessary to prepare approximate expressions different from each other so as to correspond to the respective sections, so that a large number of approximate expressions are required. Further, it is necessary to give a large number of parameters to the approximate expressions, so that it takes much time to perform such calculation. Also, such condition raises the problem that the $\gamma$ correction is inaccurately performed.

SUMMARY OF THE INVENTION

The present invention was devised in view of the foregoing problems, and one of the features consistent with principles of embodiments of the present invention is to provide a display device conversion device, a display device correction circuit, a display device driving device, a display device, a display device examination device, and a display method, which require less trouble and time in approximating an input/output characteristic than a conventional technique.

In order to solve the foregoing problems, the display device conversion device of the present invention converts an inputted video signal by using an inverse function of a sigmoid function obtained by approximating an input/output characteristic of a display panel so as to output the video signal.

The sigmoid function is an example of a monotonically increasing function which has a saturation characteristic. Here, the saturation characteristic is such characteristic that: as to function $y=f(x)$, when x is set to $+\infty$ $(-\infty)$, y converges to a certain value. That is, due to the saturation characteristic, when the input is $+\infty$ $(-\infty)$, y converges to a constant value, and the function is monotonically increasing until y converges, so that the output of the function is represented by an S-shaped curve. Note that, the function has an inflection point which causes a quadric derivative of the function to be 0. Further, a linear derivative of the function is 0 when the input is $+\infty$ $(-\infty)$, and the function has a finite value around the inflection point.

Thus, when the sigmoid function is used, it is possible to easily approximate an S-shaped input/output characteristic of the display panel in accordance with a single sigmoid function. That is, in the display device conversion device according to the present invention, the S-shaped input/output characteristic of the display panel is approximated in accordance with a single function (single characteristic), so that it is not necessary to connect plural function to each other unlike the conventional techniques. Thus, it is possible to omit the trouble and the time taken to determine (i) the continuity of the plural functions and (ii) positions at which the plural functions should be connected to each other.

The display device correction circuit of the present invention includes: a display device conversion device for converting a video signal inputted to the display device conversion device, by using an inverse function of a sigmoid function obtained by approximating an input/output characteristic of a display panel, so as to output the video signal; and a $\gamma$ conversion circuit for converting a video signal inputted to the $\gamma$ conversion circuit so that an image displayed in the display panel has a desired $\gamma$ characteristic, so as to output the video signal.

The display device correction circuit includes a display device conversion device for performing the conversion by using an inverse function of a sigmoid function obtained by approximating an input/output characteristic of a display panel. When an image based on the video signal which has passed through the display device conversion device is displayed in the display panel by using merely the display device conversion device and the display panel, intensity of the videos signal inputted to the display device and a display output of the display panel are in proportion to each other.

Here, the display device correction circuit includes a $\gamma$ conversion circuit which converts the inputted video signal so that an image of the display panel has a desired $\gamma$ characteristic and outputs the video signal. Thus, the inputted video signal is converted so that the display characteristic of the display panel is corrected, and the video signal is converted so as to have a desired $\gamma$ characteristic, so that it is possible to realize the $\gamma$ characteristic with high accuracy. For example, it may be arranged so that a liquid crystal panel is used as the display panel and the desired $\gamma$ characteristic corresponds to a $\gamma$ characteristic of the CRT.

The display device of the present invention includes: a display device conversion device for converting the video signal, by using an inverse function of a sigmoid function obtained by approximating an input/output characteristic of the display panel, so as to output the video signal; and the display panel for displaying an image in accordance with the video signal converted by the display device conversion device.

According to the arrangement, the S-shaped input/output characteristic of the display panel is approximated by using a single function, so that it is not necessary to connect plural functions to each other unlike the conventional techniques. Thus, it is possible to omit the trouble and the time taken to determine (i) the continuity of the plural functions and (ii) positions at which the plural functions should be connected to each other.

The display device of the present invention includes: a display device correction circuit which includes (i) a display device conversion device for converting a video signal inputted to the display device conversion device, by using an inverse function of a sigmoid function obtained by approximating an input/output characteristic of a display panel, so as to output the video signal and (ii) a $\gamma$ conversion circuit for converting a video signal inputted to the $\gamma$ conversion circuit so that an image displayed in the display panel has a desired $\gamma$ characteristic, so as to output the video signal; and the display panel for displaying an image in accordance with the video signal outputted by the display device conversion device.

According to the arrangement, an image based on the video signal the has passed through the display device correction circuit is displayed, so that it is possible to realize the desired image characteristic regardless of the input/output characteristic of the display panel.

The display device driving device of the present invention generates a driving voltage for driving a display panel in accordance with an inputted video signal that has been converted by a display device conversion device for converting the video signal, by using an inverse function of a sigmoid function obtained by approximating an input/output characteristic of the display panel, so as to output the video signal.

The driving device generates a driving voltage for driving the display panel in accordance with a video signal, outputted from the display device conversion device, which has been corrected so as to correspond to the input/output characteristic of the display panel. Thus, it is not necessary to provide a structure for performing correction according to the input/output characteristic of the display panel on the display device driving device. Thus, it is possible to simplify the arrangement of the display device driving device. Further, the display device driving device and the display device conversion device are separately provided. Thus, even in a case where the input-output characteristic is varied by changing the display panel, the display device conversion device can cover the variation of the input/output characteristic, so that it is not necessary to change the display device driving device.

The display device examination device of the present invention includes: a luminance measuring device for measuring luminance of a display panel which displays an image in accordance with a video signal converted by a display device conversion device for converting the video signal, by using an inverse function of a sigmoid function obtained by approximating an input/output characteristic of a display panel, so as to output the video signal; and a parameter calculating section for calculating a parameter contained in the sigmoid function of the display device conversion device, in accordance with a measurement result given by the luminance measuring device, so as to output the parameter to the display device conversion device.

According to the arrangement, the parameter calculating section calculates the parameter contained in the sigmoid function of the display device conversion device, in accordance with actual luminance of the display panel, so as to output the parameter to the display device conversion device. Thus, it is possible to obtain the parameter contained in the sigmoid function with the desired accuracy.

For a fuller understanding of the nature and advantages of the invention, reference should be made to the ensuing detailed description taken in conjunction with the accompanying drawings.

DESCRIPTION OF THE EMBODIMENTS

The following description will explain one embodiment of the present invention with reference to FIG. 1 to FIG. 10.

Figure 1:
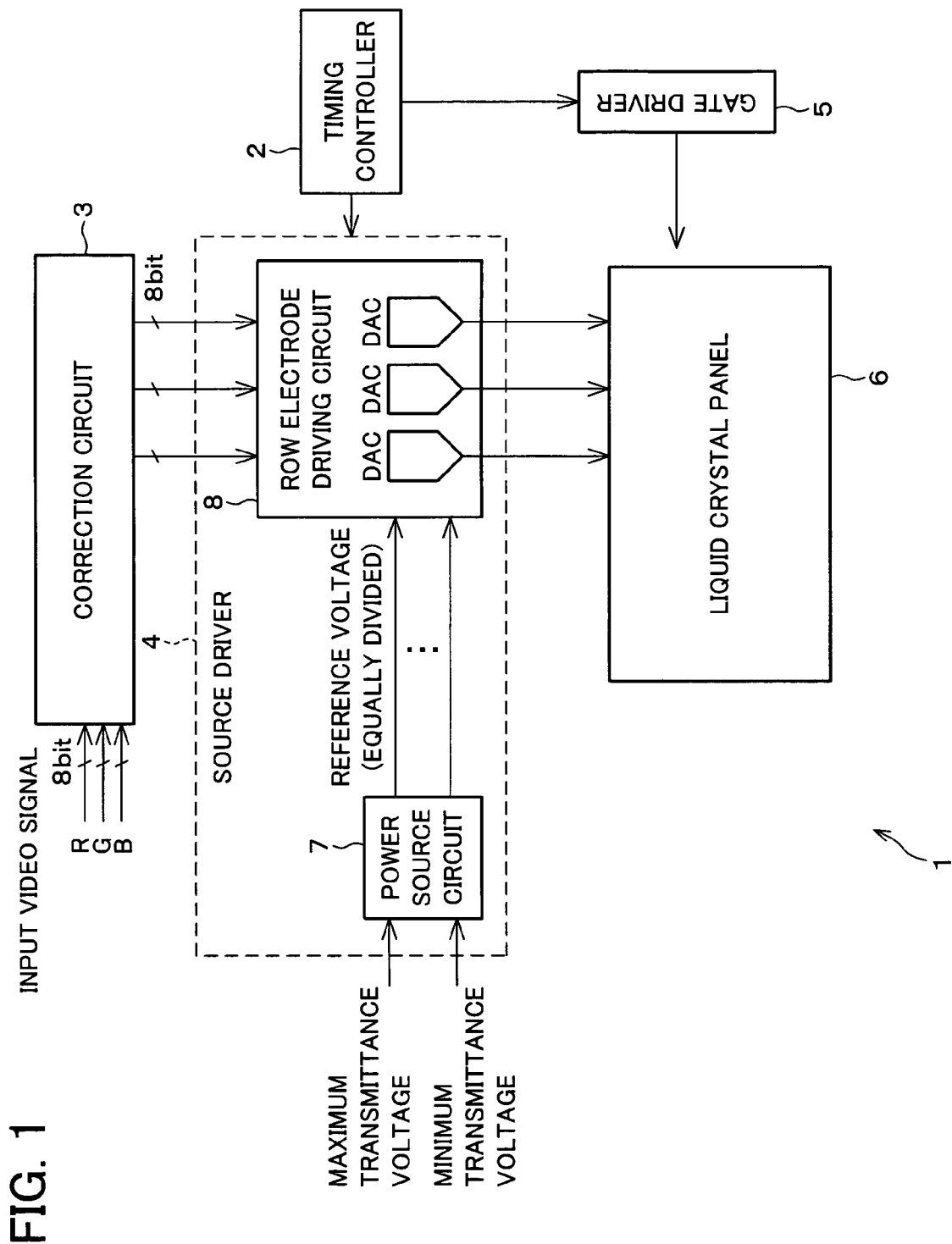
FIG. 1 is a block diagram schematically showing a structure of a display device which is one embodiment of the present invention.

As shown in FIG. 1, a liquid crystal display device (display device) 1 schematically includes a timing controller 2, a correction circuit (display device correction circuit) 3, a source driver (display device driving device) 4, a gate driver 5, and a liquid crystal panel (display panel) 6.

The liquid crystal display device 1 causes the liquid crystal panel 6 which functions as a display panel to display an image based on an inputted video signal.

The timing controller 2 transmits control signals to the source driver 4 and the gate driver 5. The timing controller 2 generates the control signals to the source driver 4 and the gate driver 5 in accordance with an input signal (not shown), so as to transmit the respective control signals to the source driver 4 and the gate driver 5.

Further, the correction circuit 3 corrects the inputted video signal so as to output the video signal to the source driver 4. The correction circuit 3 will be detailed later. Note that, in the present embodiment, as the inputted video signal (data signal), digital signals corresponding to colors RGB each of which is 8 bits are inputted.

The source driver 4 generates a driving voltage, according to the control signal from the timing controller 2, on the basis of the video signal inputted from the correction circuit 3. Thereafter, the source driver 4 outputs the driving voltage to a source bus line. The source driver 4 includes a power source circuit 7 and a row electrode driving circuit 8.

The power source circuit 7 provides reference voltages to a DAC (Digital to Analog Converter) of the row electrode driving circuit 8. The reference voltage is obtained by equally dividing a voltage difference between a voltage which causes the liquid crystal to have a minimum transmittance and a voltage which causes the liquid crystal to have a maximum transmittance, and each of the voltages thus equally divided corresponds to the reference voltage.

Note that, when the video signal is inputted directly to the source driver 4 without using the correction circuit 3, a halftone display characteristic of the liquid crystal panel 6 is represented by the S-shaped applied voltage-transmittance (V-T) curve indicative of a characteristic that the liquid crystal itself originally includes.

The row electrode driving circuit 8 outputs a voltage, according to the inputted video signal of 8 bits, to the source bus line (row electrode) of the liquid crystal panel 6 (the bus line is not shown). In more detail, the DAC internally provided on the row electrode driving circuit 8 outputs a voltage (voltage from the power source circuit 7), obtained by equally dividing a voltage difference between a voltage which causes the liquid crystal to have a minimum transmittance and a voltage which causes the liquid crystal to have a maximum transmittance into 256 sections, which corresponds to each of the voltages thus equally divided, in accordance with digital-8-bit information (video signal).

Note that, in the present embodiment, the 8-bit digital signal is used as the video signal, but the number of bits is not limited to 8.

The gate driver 5 outputs a gate pulse to the gate bus line of the liquid crystal panel 6, in accordance with the timing controller 2, so as to correspond to a timing at which the source driver 4 operates. Thus, in the liquid crystal panel 6, pixel transistors in a designated row are turned ON.

The liquid crystal panel 6 includes the source bus line (not shown), a gate bus line, glass substrates, a transistor, and pixels. In the liquid crystal panel 6, a liquid crystal layer is sandwiched by the glass substrates as a pixel, and an electrode formed on the glass substrate applies a voltage to the liquid crystal, thereby displaying an image.

In the liquid crystal panel 6, the source bus line is connected to the source driver 4, and the gate bus line is connected to the gate driver 5. The glass substrates are disposed so as to sandwich the pixel. The transistor is provided on the one glass substrate, and is connected to the gate bus line, and its source is connected to the source bus line, and its drain is connected to the pixel. The pixel receives (i) a voltage from the transistor provided on the one glass substrate and (ii) a voltage from a power source circuit (not shown) provided on the other glass substrate.

When the video signal is inputted from the outside to the liquid crystal display device 1 arranged in the foregoing manner, the correction circuit 3 performs correction so as to input the video signal to the source driver 4. The timing controller 2 transmits the control signals to the source driver 4 and the gate driver 5 at a desired timing, thereby displaying an image based on the video signal in the liquid crystal panel 6.

By performing the foregoing processes, the externally inputted video signal whose gradation data is 8 bits is corrected by the correction circuit 3 so as to have a desired γ characteristic. Thus, the video signal indicates a gradation having the desired γ characteristic, and the liquid crystal display device 1 displays an image based on the video signal.

Here, the correction circuit 3 is detailed as follows. The correction circuit 3 includes a γ conversion circuit (gradation resolution increasing section) 9, a sigmoid inverse function generator (display device conversion device) 10, and a gradation interpolation circuit 11.

The γ conversion circuit 9 converts the inputted 8-bit digital signal in accordance with a predefined γ value. In more detail, input data x is converted into normalized output data $y=x^\gamma$, so as to be outputted. Alternatively, the normalized input data x is converted into normalized output data $Y=X^\gamma$, so as to be outputted.

Further, the γ conversion circuit 9 of the present embodiment increases the gradation resolution (8 bits) of the input data signal. After completing the correcting calculation, the γ conversion circuit 9 outputs the input data signal as a data signal having a higher gradation resolution (10 bits). That is, the γ conversion circuit 9 receives the 8-bit digital signal, and performs the γ correction with respect to the digital signal, and outputs the digital signal, that has been subjected to the γ correction, as a 10-bit digital signal.

In this manner, the gradation resolution of the data signal that has been subjected to the correcting calculation is increased from 8 bits to 10 bits. This enables an image to be displayed while keeping the accuracy of the correcting calculation. That is, since there is a large difference between (i) the V-T curve that the liquid crystal originally includes and (ii) an exponential curve of γ=2.2, a gradation corresponding to 10 bits is prepared so as to display an image as described above. By preparing the 10-bit gradation, it is possible to suppress the bit fall caused by performing the correcting process. Note that, when the γ conversion circuit 9 has higher gradation resolution of the output signal than an output gradation resolution (8 bits) of the row electrode driving circuit 8 of the source driver 4 (described later), it is preferable to perform interpolation in accordance with area coverage modulation or the like.

Note that, in a case where a final γ value as a display device is continuously fixed, it may be so arranged that an LUT (Look Up Table) using a ROM (Read Only Memory) constitutes the γ conversion circuit 9. When an input data signal is given to an address input of the ROM, it is possible to obtain a corresponding data output that has been written in advance. Further, in a case where the γ value is varied depending on images, the content of the LUT is updated by a state amount calculation setting circuit such as a video signal luminance distribution judging circuit.

The output signal of the γ conversion circuit 9 is inputted to the sigmoid inverse function generator 10 so as to correspond to each of RGB. In the sigmoid inverse function generator 10, an inverse function of a sigmoid function defined by an expression 1 described later is used to convert an input signal into an output signal. The sigmoid inverse function generator 10 uses a single function. Here, "using a single function" means to use the same single function with respect to whole the input signal without dividing the characteristic into sections.

The sigmoid inverse function generator 10 of the present embodiment is realized by using a device, such as a DSP (Digital Signal Processor), which can be programmed. When the DSP is used in this manner, it is possible to cover variation in a characteristic of a target liquid crystal.

Here, the sigmoid function is a monotonically increasing function having a saturation characteristic.

The saturation characteristic means that: as to function $y=f(x)$, when x is $+\infty$ ($-\infty$), y converges to a certain value. The saturation characteristic causes the input to converge into a certain value when input is $+\infty$ ($-\infty$), and the function is monotonically increasing until y converges, so that the output of the function is represented by an S-shaped curve. The sigmoid function used in the present embodiment is represented by the S-shaped curve in this manner, so that the V-T curve of the liquid crystal is easily approximated. Further, the sigmoid function is represented by the S-shaped curve, so that it is possible to approximate the V-T curve of the liquid crystal without using plural functions (is represented by the S-shaped curve, so that it is possible to approximate the V-T curve of the liquid crystal without dividing the characteristic), so that it is not necessary to take trouble to divide the characteristic. Further, the sigmoid function is a continuous function. Further, the sigmoid function is differentiable (differentiable in whole the range), and monotonously increases, and has boundedness.

An example of the sigmoid function is represented by the following expression 1.

$$S_i = \sum_{n=0}^{n=i} \exp\left\{-\frac{(n-x_0)^2}{\sigma^2}\right\}$$ Expression 1

In the expression 1, Si is an output, and n is an input. Further, a quantifying level number is m. The quantifying level number is level resolution of the input/output, and corresponds to the gradation resolution. In the example of the sigmoid function shown by the expression 1, $\sigma$ and $x_0$ are parameters. Note that, the expression 1 can be represented by the following expression in accordance with integration.

$$S(i) = \int_0^i \exp\left\{-\frac{(n-x_0)^2}{\sigma^2}\right\} dn$$ Expression 2

Further, when the expression 1 is normalized so that a maximum value of the input/output is 1 and a minimum value of the input/output is 0, the following expression 3 holds.

$$S_{(norm)i} = \frac{S_i - S_0}{S_m - S_0} m$$ Expression 3

Figure 3:
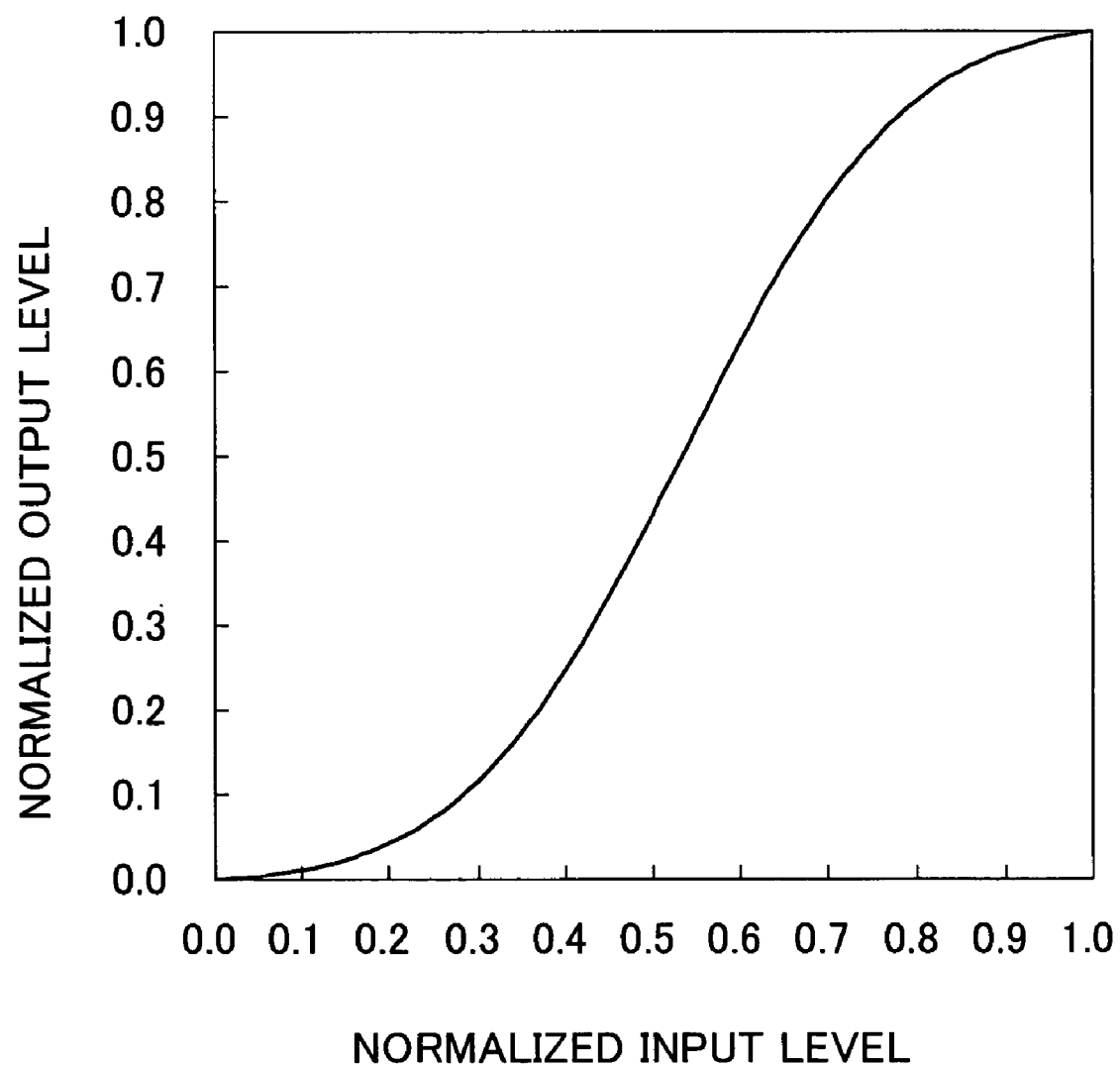
FIG. 3 shows an example of a curve based on a sigmoid function.
Figure 4:
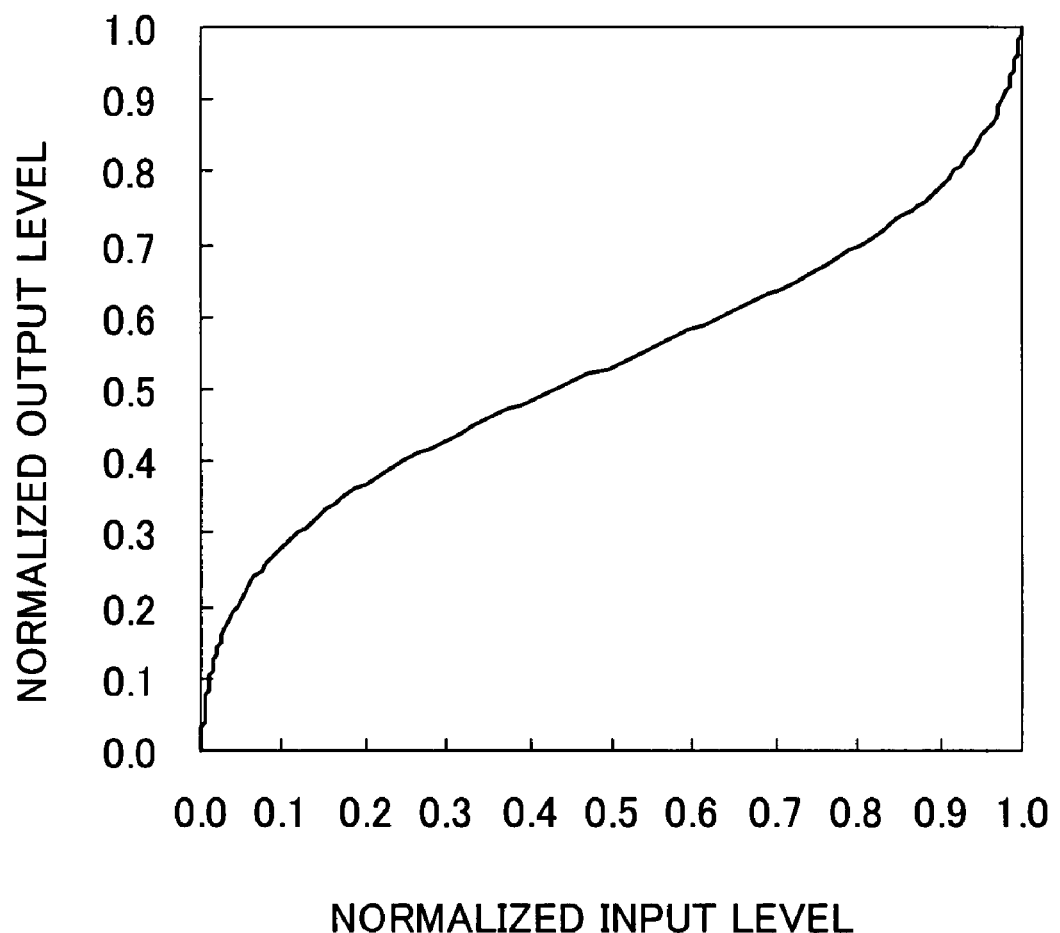
FIG. 4 shows an inverse function of the sigmoid function shown in FIG. 3.

Here, FIG. 3 shows a curve obtained by normalizing the sigmoid function of the expression 1 in the same manner as in the expression 3. In this manner, the curve based on the sigmoid function is represented by an S-shaped curve. Here, values of the parameters are as follows: $\sigma=30$ and $x_0=50$. Further, FIG. 4 shows an inverse function of the sigmoid function shown in FIG. 3. Note that, the inverse function is a function obtained by inverting the input and the output.

Figure 5:
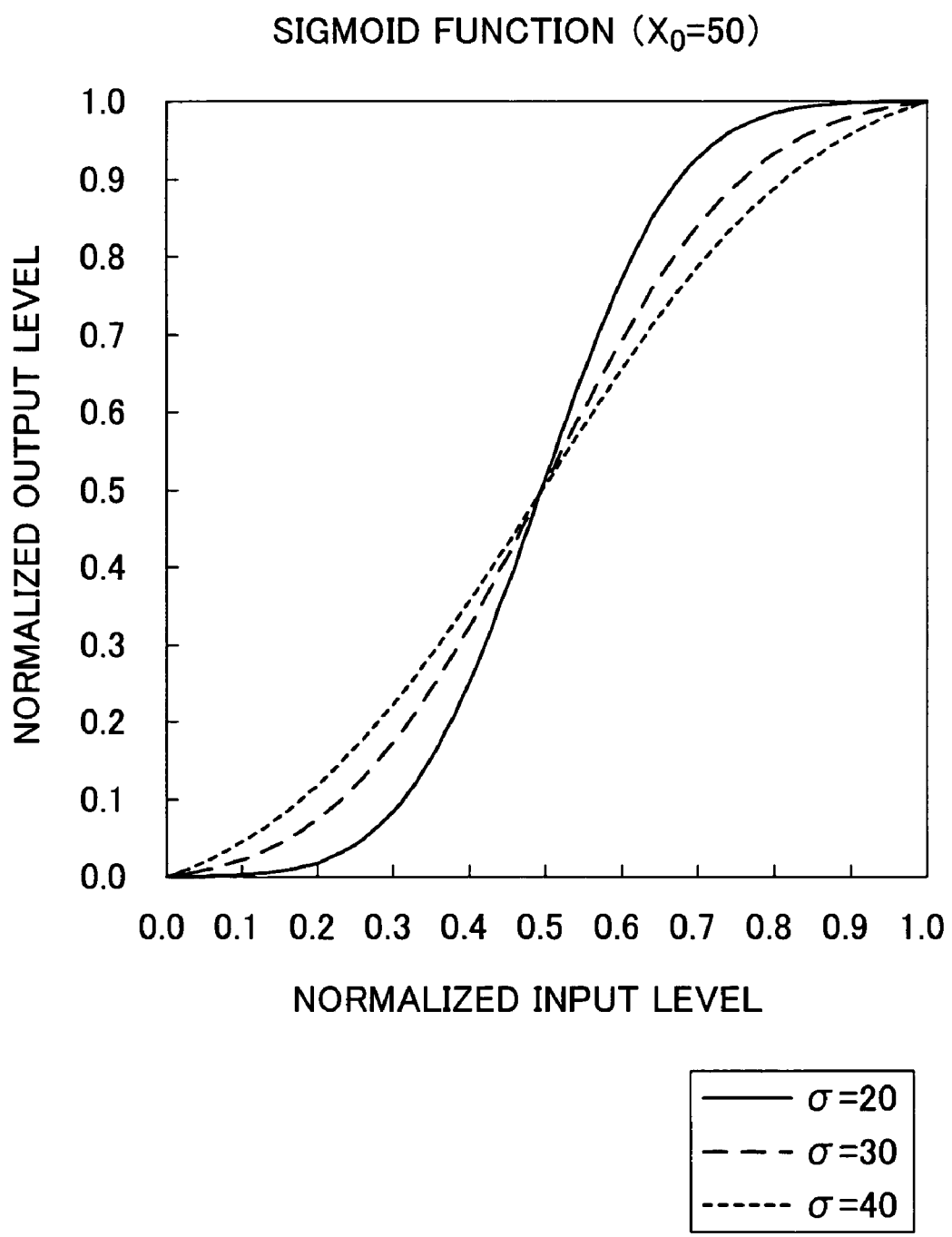
FIG. 5 shows how a slope of the sigmoid function shown in FIG. 3 varies in a case where a parameter σ of the sigmoid function is varied.

Here, FIG. 5 shows that: when the parameter $\sigma$ is changed from a condition under which $\sigma=30$ so as to be under such condition that $\sigma=20$ and $\sigma=40$, a slope of the sigmoid function is varied. In this manner, the parameter $\sigma$ makes a slope in the initial rise. Alternatively, this can be expressed as follows: the parameter $\sigma$ determines a slope in an inflection point of the S-shaped curve.

Figure 6:
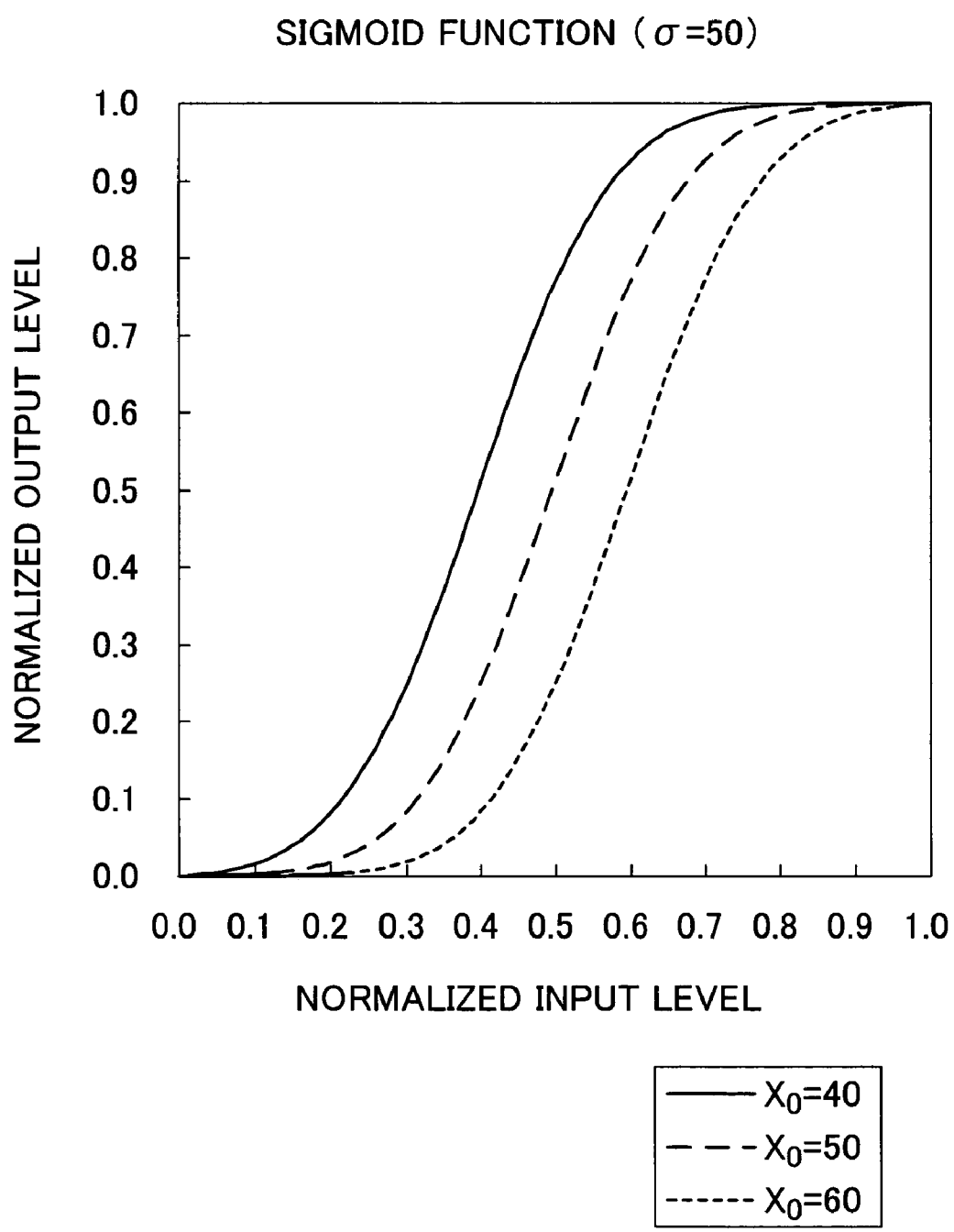
FIG. 6 shows how the slope of the sigmoid function shown in FIG. 3 varies in a case where a parameter $x_0$ of the sigmoid function is varied.

Further, FIG. 6 shows that: when the parameter $x_0$ is changed from a condition under which $x_0=50$ so as to be under such condition that $x_0=40$ and $x_0=60$, a position of an S-shaped portion of the sigmoid function is varied. In this manner, the parameter $x_0$ gives a point where the output of the function rises. Alternatively, this can be expressed as follows: the parameter $x_0$ determines a position of an inflection point of the S-shaped curve.

These two parameters $\sigma$ and $x_0$ are set as required so as to correspond to the V-T curve of the target liquid crystal panel. Thus, the sigmoid function is approximated to the applied voltage-transmittance characteristic curve (V-T curve) of the liquid crystal in which the voltage is applied from the driving circuit to the liquid crystal element.

Here, in the present embodiment, the two parameters $\sigma$ and $x_0$ each of which determines the sigmoid function can be varied in accordance with the input level, so that it is possible to realize more practical approximation. For example, it may be so arranged that: $x_0$ or $\sigma$ can be selected in accordance with a setting mode, and whether a result obtained by correcting the V-T curve by the inverse function is a straight line or not is confirmed, thereby determining a most appropriate value.

Alternatively, for example, it may be so arranged that: a least squares method is used with respect to a predetermined V-T curve corresponding to the used liquid crystal, thereby determining the most appropriate value. That is, the V-T curve corresponding to the used liquid crystal is plotted, and a sigmoid function approximated to the plotted V-T curve is determined by using the least square method.

Alternatively, for example, it may be so arranged that: the input signal is converted while selecting $x_0$ or $\sigma$ of the sigmoid function, and the converted input signal is adjusted so that $\gamma=1.0$ (the input level and the output luminance are in proportion to each other) when an image based on the signal is displayed in the liquid crystal, thereby determining the parameter. In this case, the $\gamma$ conversion circuit 9 positioned before the sigmoid inverse function generator 10 is set so as not to process a signal passing therethrough. Note that, the calculation may be performed by using three or more parameters so as to determine the sigmoid function.

As described above, not only the data signal but also two parameters $x_0$ or $\sigma$ are given to the sigmoid inverse function generator 10 so as to approximate the voltage-transmittance curve of the target liquid crystal. Further, the output data is calculated in accordance with the inverse function derived from the expressions 1 and 2.

As described above, the sigmoid inverse function generator 10 included in the correction circuit 3 outputs a signal, that has been subjected to the level correction, on the basis of the inverse function of an approximate expression obtained by approximating an original voltage-transmittance curve according to an inputted video signal. The approximate expression is derived from the expression 1, so that the inverse function is derived therefrom so as to be applied.

Note that, the sigmoid inverse function generator 10 may be arranged so that the inverse function obtained by calculation is stored in a rewritable memory device (LUT). Further, in this case, when the rewritable memory device is used, it is possible to cover the variation in the characteristic of the target liquid crystal.

Here, in the aforementioned source driver 4, a reference voltage generated by the power source circuit 7 is obtained by equally dividing a voltage difference between a voltage which causes the target liquid crystal to have a minimum transmittance and a voltage which causes the target liquid crystal to have a maximum transmittance, and each of the voltages thus equally divided corresponds to the reference voltage. Thus, in the row electrode driving circuit 8 of the source driver 4, a relationship between an input and an output is linearly represented. Thus, the correction is not performed only by the power source circuit 7 and the row electrode driving circuit 8. That is, even when the video signal is inputted directly to the source driver 4 without passing through the correction circuit 3, the correction is not performed.

However, in the present embodiment, the sigmoid inverse function generator 10 causes a level of the video signal inputted via the correction circuit 3 to the source driver 4 to have a characteristic opposite to the transmittance characteristic of the liquid crystal as described. Thus, a relationship between (i) a voltage (external input level) which is applied from the source driver 4, according to the sigmoid inverse function generator 10, to the liquid crystal panel 6 and (ii) the transmittance of the liquid crystal of the liquid crystal panel 6 is linearly represented ($\gamma=1.0$).

Further, it is generally often that the $\gamma$ characteristic realized in the display panel (display) of the imaging system is such that: $\gamma=1.8$ to 2.4. Then, in the present embodiment, the data signal inputted to the sigmoid inverse function generator 10 of the correction circuit 3 is converted so that the γ conversion circuit 9 gives a desired γ value in advance. Thus, a relationship between (i) the voltage (external input level) which is applied from the source driver 4, according to the γ conversion circuit 9, via the sigmoid inverse function circuit 10 to the liquid crystal panel 6 and (ii) the transmittance of the liquid crystal of the liquid crystal panel 6 is finally corrected to a γ value set so that γ=1.8 to 2.4 for example.

Note that, it may be so arranged that: a γ curve (γ value to be set) of the γ conversion circuit 9 is rewritten depending on images or use thereof. Further, when it is not necessary to perform correction for changing the γ characteristic (when γ=1.0), the γ conversion circuit 9 is not required.

Figure 2:
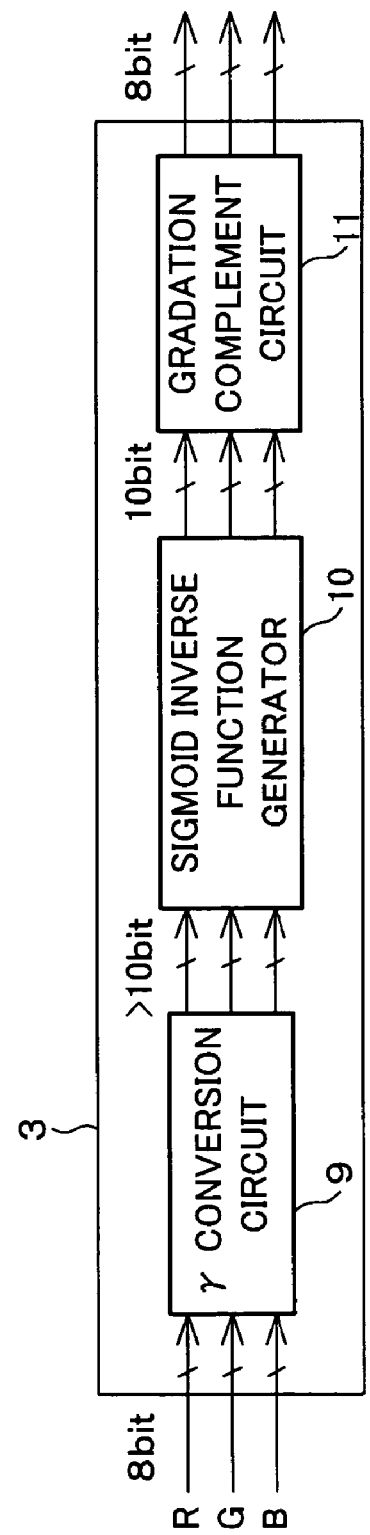
FIG. 2 is a block diagram showing an example of a structure of a correction circuit provided on the display device of FIG. 1.

In the process performed from the γ conversion circuit 9 to the sigmoid inverse function circuit 10, as shown in FIG. 2, the calculation process is performed at not less than 10 bits (>10 bits), for example, at 12 bits, so as to minimize a quantization error of data. The output from the sigmoid inverse function generator 10 is quantized into 10 bits.

The data signal outputted from the sigmoid inverse generator 10 is inputted to the gradation interpolation circuit 11. The gradation interpolation circuit 11 has gradation resolution of 10 bits upon inputting data, and the gradation interpolation circuit 11 reduces its gradation resolution so as to output 8-bit data.

The gradation interpolation circuit 11 superimposes 10-bit data into the 8-bit data by using FRC (Frame Rate Control) which is time-series calculation, or area coverage modulation such as dither and an error diffusing process. That is, 256-gradation display of 1024-gradation display is performed in a pseudo manner. Thus, compared with a case where 256-gradation display is performed under such condition that the output of the sigmoid inverse function generator 10 is set to 8 bits from the beginning for example, it is possible to express smoother and finer gradation variation.

For example, the area coverage modulation is detailed as follows. Let us consider a case of an average gradation of plural pixels in a certain area as a simplest case. For example, an average gradation of 4×4 pixels in a single area can contain 16 times as many gradation as original gradation of the single area. Further, human perception does not recognize gradation in each pixel, but recognizes an average gradation of a certain area. Making use of this, it is possible to increase "apparent" gradation.

When the process is performed at many bits and the area coverage modulation is applied at the final stage in this manner, 256-gradation display which can be realized by the device is performed, so that it is possible to express higher gradation as "apparent gradation", thereby making the bit fall invisible. Note that, in this case, such arrangement brings about such disadvantage that deterioration of resolution in the display image is accompanied, but it is possible to improve such disadvantage by using the dither or the error diffusing process as a general technique.

Note that, when a bit is rounded down for each process so as to perform 256-gradation display in a simple manner for example, the bit fall occurs, so that a pseudo outline occurs in the image. Further, there is a large difference between (i) the V-T curve that the liquid crystal originally includes and (ii) the exponential curve of γ=2.2. Thus, when it is so arranged that the gradation corresponding to 10 bits can be expressed as described above, it is possible to lessen the bit fall caused by the calculation process.

Note that, as to the gradation interpolation circuit 11, when the liquid crystal display device 1 is used like the present embodiment, care may be taken so as not to bring about interference with alternating polarity inversion in the FRC or the dither, and care may be taken so as not to bring about flickering related with response speed in the FRC, as a peculiar problem of the liquid crystal.

In this manner, the data signal outputted from the gradation interpolation circuit 11 is inputted to the source driver 4, thereby displaying the data signal in the liquid crystal panel 7 as described above.

As described above, the liquid crystal display device 1 according to the present embodiment includes the sigmoid inverse function generator 10 for approximating the applied voltage-transmittance characteristic curve (V-T curve) of the liquid crystal, that is ordinarily S-shaped, by a single function without dividing the characteristic into sections, thereby performing the correction. Further, the sigmoid inverse function generator 10 uses the sigmoid function as a function expression. Further, the correction circuit 3 provided with the sigmoid inverse function generator 10 is further includes the γ conversion circuit 9.

Thus, it is possible to realize the γ characteristic, based on the γ conversion circuit 9, with high accuracy, without depending on the characteristic of the liquid crystal panel 6. Further, it is possible to approximate the S-shaped input/output characteristic of the liquid crystal panel 6 with high accuracy by using the sigmoid function which is an S-shaped curve. Further, it is possible to approximate the input/output characteristic without using plural functions, so that it is possible to omit the trouble taken to perform the calculation (it is possible to approximate the input/output characteristic without dividing the curve into sections, so that it is possible to omit the trouble taken to perform the calculation).

Further, the liquid crystal display device 1 carries out a display method in which: the applied voltage-transmittance characteristic curve (V-T curve) of the liquid crystal, that is ordinarily S-shaped, is approximated by the monotonically increasing sigmoid function, being sequential and differentiable from a minimum level to a maximum level of a video signal, which has a saturation characteristic, so as to convert the video signal by using an inverse function of the function.

Then, the display method may be carried out by using a program which causes a computer to function as a correction circuit for carrying out the display method. That is, the correction circuit 3 may be realized by a program which causes a computer to function as a correction circuit of a display device which converts inputted data in accordance with the monotonously increasing function having the saturation characteristic.

Further, in the source driver 4 of the present embodiment, when merely the source driver 4 displays an image in the liquid crystal panel 6, the halftone display characteristic itself becomes the S-shaped V-T curve. That is, this is a source driver arranged in a simple manner. The source driver 4 receives a corrected video signal from the correction circuit 3, and uses the corrected video signal, so that it is possible to make desired display. Further, even when the characteristic of the liquid crystal panel 6 is varied, the correction circuit 3 performs the collection according to the variation, so that it is not necessary to vary the source driver 4.

Note that, in the aforementioned embodiment, the liquid crystal display device 1 used as a display device is described as an example, but the display device according to the present invention is not limited to this. It is possible to use a display device provided with a display panel using a material other than the liquid crystal. For example, as long as the display panel has an S-shaped electro-optical characteristic (input/output characteristic of the luminance) as a device, such arrangement can be applied to a material other than the liquid crystal.

Further, in the aforementioned embodiment, an arrangement in which the sigmoid function represented by the expression 1 is used is described, but the present invention is not limited to this.

For example, it may be so arranged that a function such as $F1(x)=1/[1+\exp(-x)]$ is used as another sigmoid function, and a rising point and a rising slope are adjusted, in accordance with a parameter a,b($0<a<1$, $0<b$), in such manner that $G1(x)=1/[1+\exp[-(x-a)/b]]$. Further, it may be so arranged that: a function normalized in such manner that $H1(x)=[G1(x)-G1(0)]/[G1(1)-G1(0)]$ is used.

Further, for example, it may be so arranged that: a function such as $F2(x)=[1+\tan h(x)]/2$ is used as still another sigmoid function, and a rising point and a rising slope are adjusted, in accordance with a parameter c,d($0<c<1$, $0<d$), in such manner that $G2(x)=[1+\tan h[(x-c)/d]]/2$, so as to perform normalization so that $H2(x)=[G2(x)-G2(0)]/[G2(1)-G2(0)]$.

Further, for example, it may be so arranged that: a function such as $F3(x)=(1/2)+(1/\pi)\arctan(x)$ is used as further another sigmoid function, and a rising point and a rising slope are adjusted, in accordance with a parameter e,f ($0<e<1$, $0<f$), in such manner that $G3(x)=(1/2)+(1/\pi)\arctan[(x-e)/f]$, so as to perform normalization so that $H3(x)=[G3(x)-G3(0)]/[G3(1)-G3(0)]$. In this arrangement, it is possible to easily calculate the inverse function.

Note that, there is a possibility that easiness or difficulty in realizing the display device may be varied according to the sigmoid function expression. Here, easiness in deriving the inverse function varies depending on the sigmoid expression. However, in a case where the a specific parameter is not determined at a real time, there may be little difference in an amount of actual calculation performed by a computer or the like after deriving the inverse function. However, the more simple the expression is, the less the amount of calculation is.

Further, in the aforementioned embodiment, an arrangement in which two parameters ($x_0$ and $\sigma$) are used to determine the sigmoid function is described, but the present invention is not limited to this. Three or more parameters may be used.

For example, it may be so arranged that: not only the first sigmoid function using $x_0$ and $\sigma$ as parameters but also a second sigmoid function using $y_0$ and $\rho$ as parameters are prepared so as to perform approximation by summing up these two sigmoid functions. Alternatively, for example, it may be arranged as follows. $x_0$ and $\sigma$ are defined by a function of n so that $\sigma=an+b$. Then, there are three parameters: $x_0$, a, and b. These three parameters are used to perform approximation.

Further, it may be so arranged that: the γ conversion circuit 9 of the correction circuit 3 uses an LUT (Look Up Table) as a conversion table. Here, the LUT represents a relationship between an input and an output as a table so as to retain the relationship.

Figure 7:
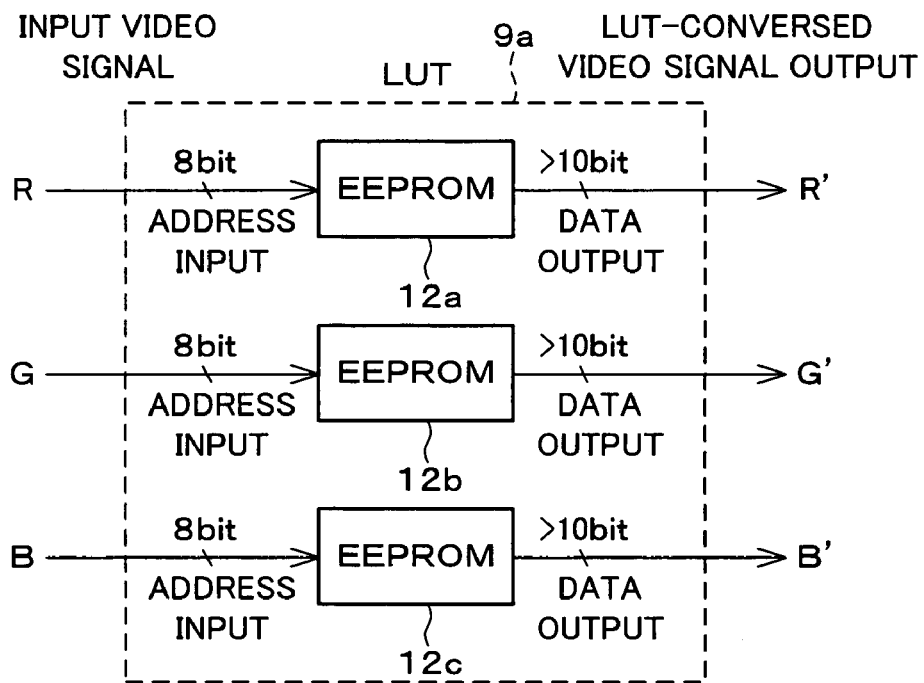
FIG. 7 is a block diagram showing an example of a γ conversion circuit which is a component of the correction circuit of FIG. 2.

For example, it may be so arranged that: a γ conversion circuit 9a shown in FIG. 7 is used instead of the γ conversion circuit 9 shown in FIG. 2. The γ conversion circuit 9a is an LUT using EEPROMs (memory element) 12a to 12c each of which is a rewritable memory device as shown in FIG. 7. The γ conversion circuit 9a includes the EEPROMs 12a to 12c respectively corresponding to colors of RGB.

As shown in FIG. 7, in the γ conversion circuit 9a which functions as the LUT, when an input data signal is given to an address input, it is possible to obtain a corresponding data output which has been written in advance. Note that, it is also possible to realize the rewritable LUT by using a nonvolatile RAM (feroelectric memory or the like) as a rewritable memory device instead of the EEPROMs 12a to 12c.

Further, instead of the EEPROMs 12a to 12c, the LUT using the ROM as a read-only memory may be used to constitute the γ conversion circuit. This arrangement is applied in the case where the final γ value as the display device is continuously fixed.

Further, it may be so arranged that the LUT as a conversion table is used as the sigmoid inverse function generator 10 of the correction circuit 3.

Figure 8:
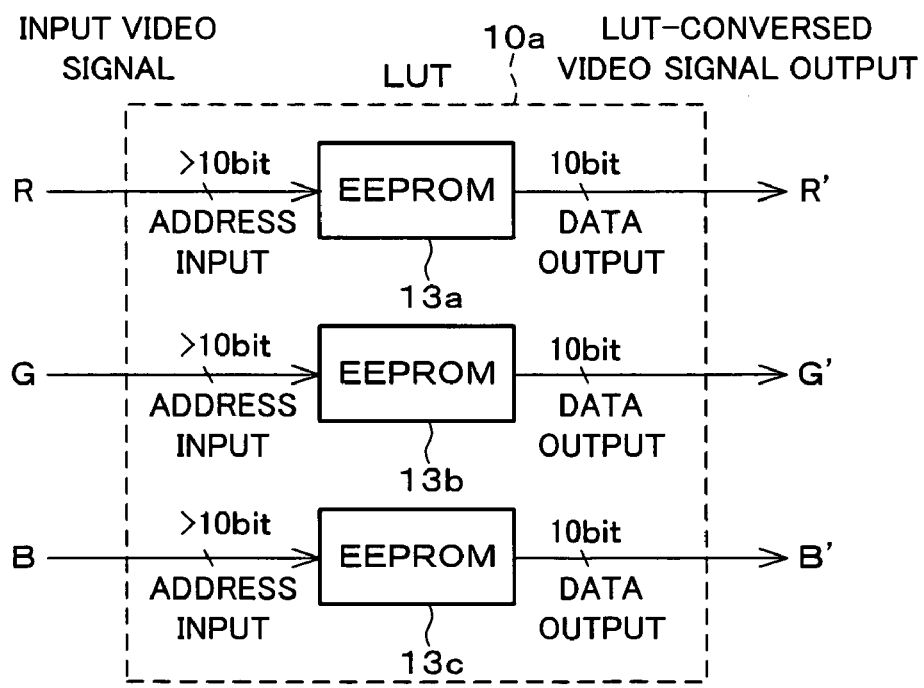
FIG. 8 is a block diagram showing an example of a sigmoid function generator which is a component of the correction circuit of FIG. 2.

For example, it is possible to use the sigmoid inverse function generator 10a shown in FIG. 8 instead of the sigmoid inverse function generator 10 shown in FIG. 2. As shown in FIG. 8, the sigmoid inverse function generator 10a is an LUT including EEPROMs 13a to 13c as storage elements respectively corresponding to colors of RGB. In each of the EEPROMs 13a to 13c, an inverse function obtained by calculation is stored.

As shown in FIG. 8, when an input data signal is given to an address input in the sigmoid inverse function generator 10a, it is possible to obtain a corresponding data output which has been written in advance.

Here, when a rewritable memory device, such as the EEPROMs 13a to 13c, is used, it is possible to cover variation in the characteristic of the target liquid crystal. Note that, it may be so arranged that a nonvolatile RAM (feroelectric memory or the like) is used instead of the EEPROM so as to constitute a rewritable memory device as the LUT. Further, it is also possible to use the ROM (Read Only Memory) instead of the EEPROM under such condition that the characteristic of the liquid crystal is continuously fixed.

Further, it may be so arranged that two circuits, i.e., the γ conversion circuit and the sigmoid inverse function generator 10 of the correction circuit 3 are combined with each other so as to constitute the LUT.

Figure 9:
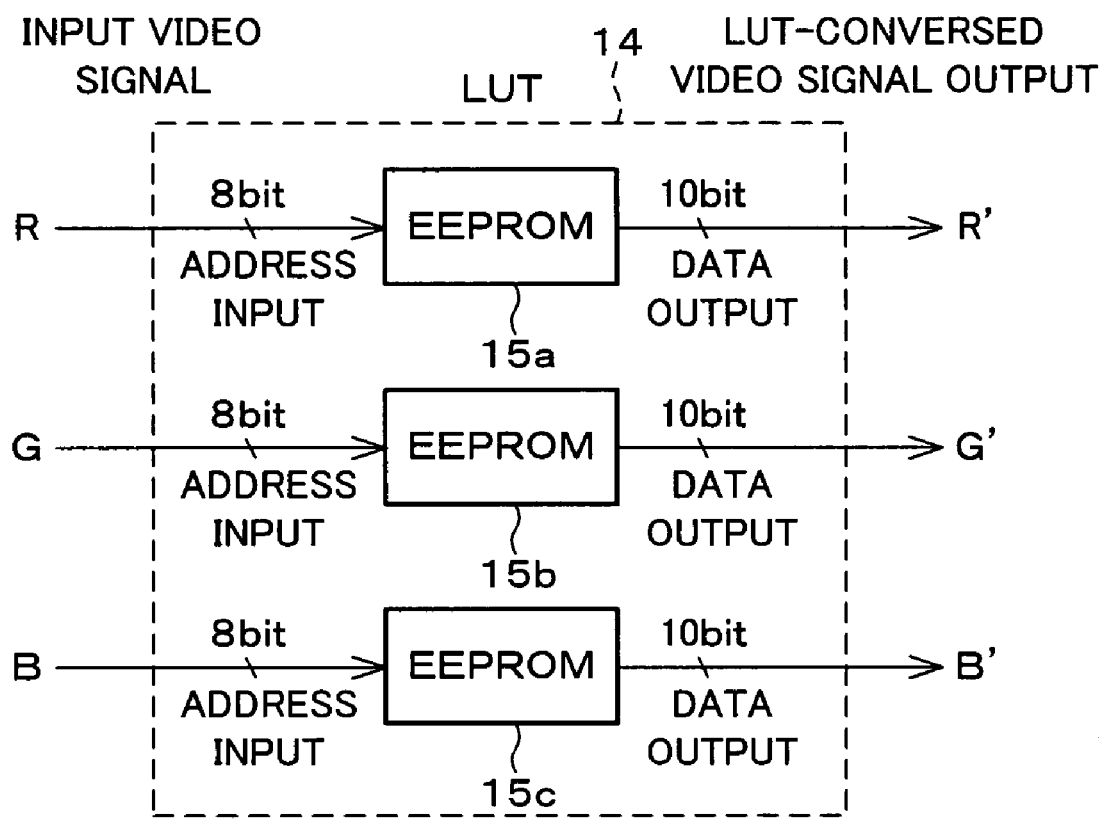
FIG. 9 is a block diagram showing a look-up table which functions as a combination of (i) the γ conversion circuit which is a component of the correction circuit shown in FIG. 2 and (ii) the sigmoid function generator shown in FIG. 2.

The LUT 14 shown in FIG. 9 as an example corresponds to the combination of the γ conversion circuit 9 and the sigmoid inverse function generator 10 that are shown in FIG. 9. As shown in FIG. 9, when an input data signal is given to an address input in the LUT 14 constituted of the EEPROMs (storage elements) 15a to 15c respectively corresponding to colors of RGB, it is possible to obtain a corresponding data output that has been written in advance. The data output is outputted to the gradation interpolation circuit 11 shown in FIG. 1 for example.

Each of the EEPROMs 15a to 15c of the LUT 14 stores the desired γ conversion and a calculation result, given by the sigmoid inverse function, that has been calculated in advance. Note that, it may be so arranged that a nonvolatile RAM (feroelectric memory or the like) is used instead of the EEPROM so as to constitute a rewritable LUT. Further, it is also possible to use the ROM instead of the EEPROM under such condition that the characteristic of the liquid crystal is continuously fixed.

Figure 10:
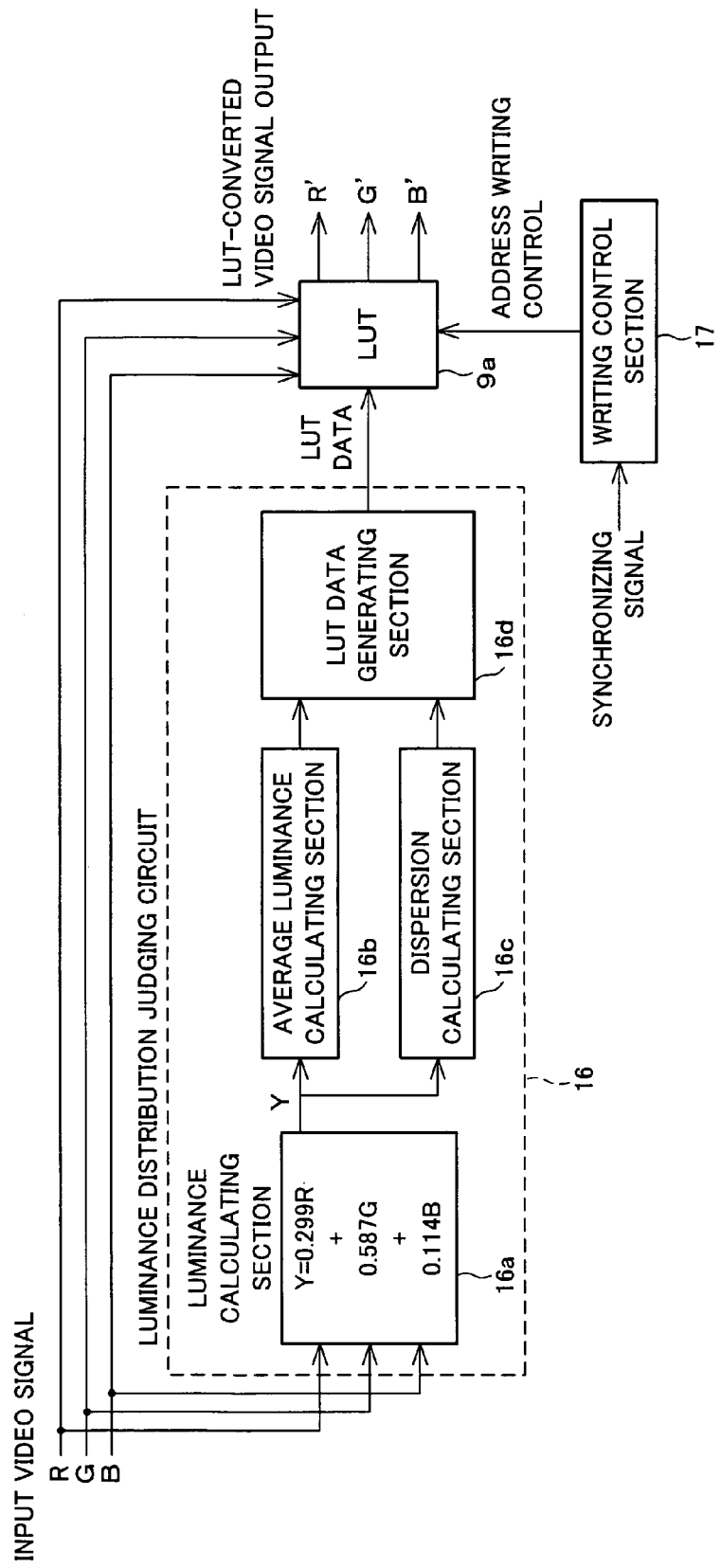
FIG. 10 is a block diagram showing an example of a structure of a luminance distribution judging circuit (state amount calculation setting circuit).

Further, it may be so arranged that the aforementioned correction circuit 3 sets the γ value of the display image depending on images to be displayed. It may be so arranged that: as shown in FIG. 10, the correction circuit 3 includes not only the γ conversion circuit 9a illustrated in FIG. 7 but also a luminance distribution judging circuit (state amount calculation setting circuit) 16 and a control section 17.

The luminance distribution judging circuit 16 uses the luminance distribution as a state amount of an image so as to give judgment. That is, the luminance distribution judging circuit 16 is a circuit for calculating luminance distribution of an image corresponding to a single screen. Further, the luminance distribution judging circuit 16 generates LUT data by using particularly an average and dispersion of the luminance of the display image, out of the luminance distribution. The luminance distribution judging circuit 16 includes a luminance calculating section 16a, an average calculating section 16b, a dispersion calculating section 16c, and an LUT data generating section 16d.

The luminance calculating section 16a calculates the luminance of each pixel in accordance with each inputted signal of RGB under such condition that: Y=0.299 R+0.587 G=0.114 B, thereby outputting the calculation result to the average calculating section 16b and the dispersion calculating section 16c.

The average calculating section 16b calculates an average (average data) of the luminance of pixels corresponding to a single image in accordance with the input data so as to output thus calculated average to the LUT data generating section 16d. The dispersion calculating section 16c calculates dispersion (dispersion data) of the luminance of the pixels corresponding to a single image in accordance with the input data so as to output thus calculated dispersion to the LUT data generating section 16d.

The LUT data generating section 16d generates LUT data, which is a new conversion table, in accordance with the inputted average data and the inputted dispersion data. For example, it may be so arranged that: in a case where a value of the dispersion data is small and the average data corresponds to a gradation whose level is high or low, the LUT data generating section 16d judges the data as document data, so that the γ value is set to be slightly large (γ to approximately 2.4) so as to enlarge the contrast of the image. Further, for example, it may be so arranged that: in a case where a value of the dispersion data is large or the average data corresponds to a halftone, the data is judged as the image data other than the document data, so that the γ value is set to be slightly small (γ to approximately 1.8) so as to realize the concentration of the halftone. The LUT data generating section 16d outputs the LUT data that has been newly generated to the LUT 9a.

In this manner, in the case where the γ conversion circuit 9a is the LUT, the luminance distribution judging circuit 16 causes the LUT data corresponding to the desired γ characteristic to be calculated and to be set in the γ conversion circuit 9a. In the case where the γ conversion circuit is not the LUT, it may be so arranged that the luminance distribution judging circuit 16 sets only the γ value of the γ characteristic.

In the LUT 9a which functions as the γ conversion circuit, not only the output data from the LUT data generating section 16d but also an address writing signal from the writing control section 17 are inputted. This causes new data to be stored in the LUT 9a.

In this arrangement, the video signal inputted to the correction circuit 3 is inputted not only to the γ conversion circuit 9a but also to the luminance distribution judging circuit 16. In accordance with a signal from the luminance distribution judging circuit 16 and the writing control section 17, the content of the γ conversion circuit 9a constituted of the LUT is updated as required. When the input data signal is given to the address of the γ conversion circuit 9a, the corresponding data that has been written in advance is outputted to the sigmoid function generator 10 (not shown).

Thereafter, the data is inputted to the gradation interpolation circuit 11 for example, and is outputted to the source driver 4, so as to be displayed in the liquid crystal panel 6.

As described above, when the luminance distribution judging circuit 16 updates the content of the LUT 9a in accordance with the inputted video data, it is possible to update the γ value depending on images.

Note that, here, the luminance distribution judging circuit 16 using the luminance distribution as a state amount is described as an example of the state amount calculation setting circuit, but the present invention is not limited to this. It is also possible to use a state amount calculation setting circuit which uses another state amount which indicates a state of an image displayed in the display panel.

Further, in the arrangement shown in FIG. 10, it is possible to use the LUT 14 shown in FIG. 9 instead of the γ conversion circuit 9a which functions as the LUT. The LUT 14 shown in FIG. 9 corresponds to a combination of the γ conversion circuit 9 and the sigmoid inverse function generator 10 that are shown in FIG. 2. When the input data signal is given to the address input in the LUT 14, it is possible to obtain a corresponding data output that has been written in advance. The data output is inputted to the gradation interpolation circuit 11 shown in FIG. 2 for example, and the same process as in the aforementioned process is performed.

Further, the aforementioned embodiment describes an arrangement of the correction circuit 3 which causes the data inputted to the correction circuit 3 to be processed in the γ conversion circuit 9, and thereafter, causes the inputted data to be inputted to the sigmoid inverse function generator 10 as shown in FIG. 2. However, the present invention is not limited to this. In terms of a basic order of signal processes, the correction circuit 3 is arranged so that the γ conversion circuit 9 and the sigmoid inverse function generator 10 are connected to each other in this order so as to be disposed in a cascade manner as shown in FIG. 2. However, if there is no problem in accuracy of the calculation, it is possible to obtain the same effect by making the following arrangement: first, the signal is processed by the sigmoid inverse function generator, and thereafter, the signal is processed by the γ conversion circuit.

Further, it may be so arranged that the correction circuit 3 is detachable with respect to a main body of the liquid crystal display device. For example, the correction circuit 3 may be realized as an interface conversion device which is inserted into a video data input terminal of the liquid crystal display device. In this case, a video data from the outside is inputted to the input side of the interface conversion device, and the output side of the interface conversion device is connected to a source driver of the liquid crystal display device. According to the arrangement, it is possible to adjust the image quality by providing the correction circuit on a conventional liquid crystal display device. Further, in the arrangement, it is preferable that the correction circuit includes a setting section (input interface) for receiving a parameter of the sigmoid function from the outside and setting the parameter of the sigmoid function. According to the arrangement, it is possible to cause the setting section to set the parameter so that γ=1.0 when an image is displayed in the display panel for example.

Embodiment b 2

Figure 11:
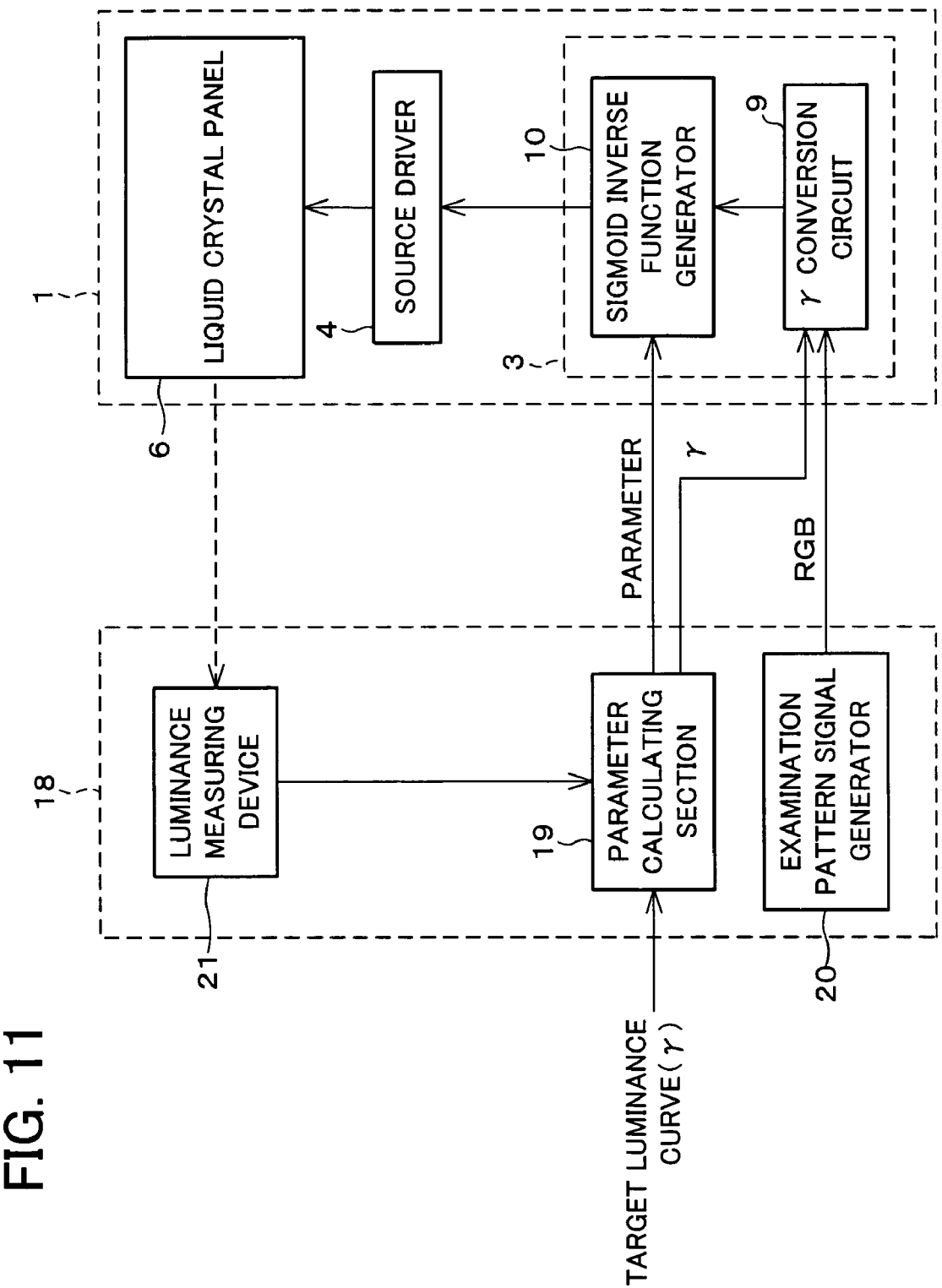
FIG. 11 is a block diagram showing an example of a structure of an examination device which is another embodiment of the present invention.
Figure 12:
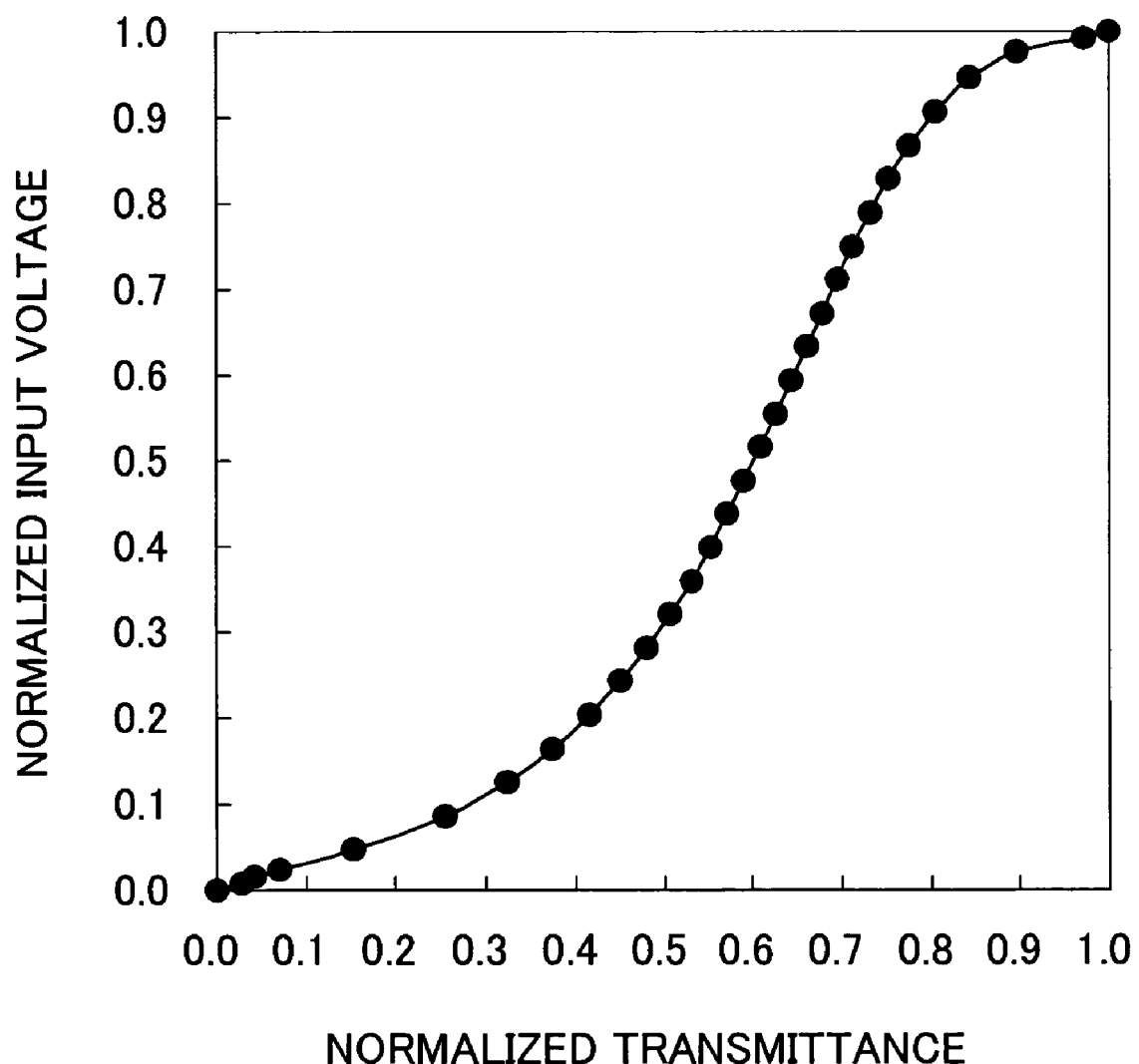
FIG. 12 shows a relationship between a voltage applied to liquid crystal and transmittance.
Figure 13:
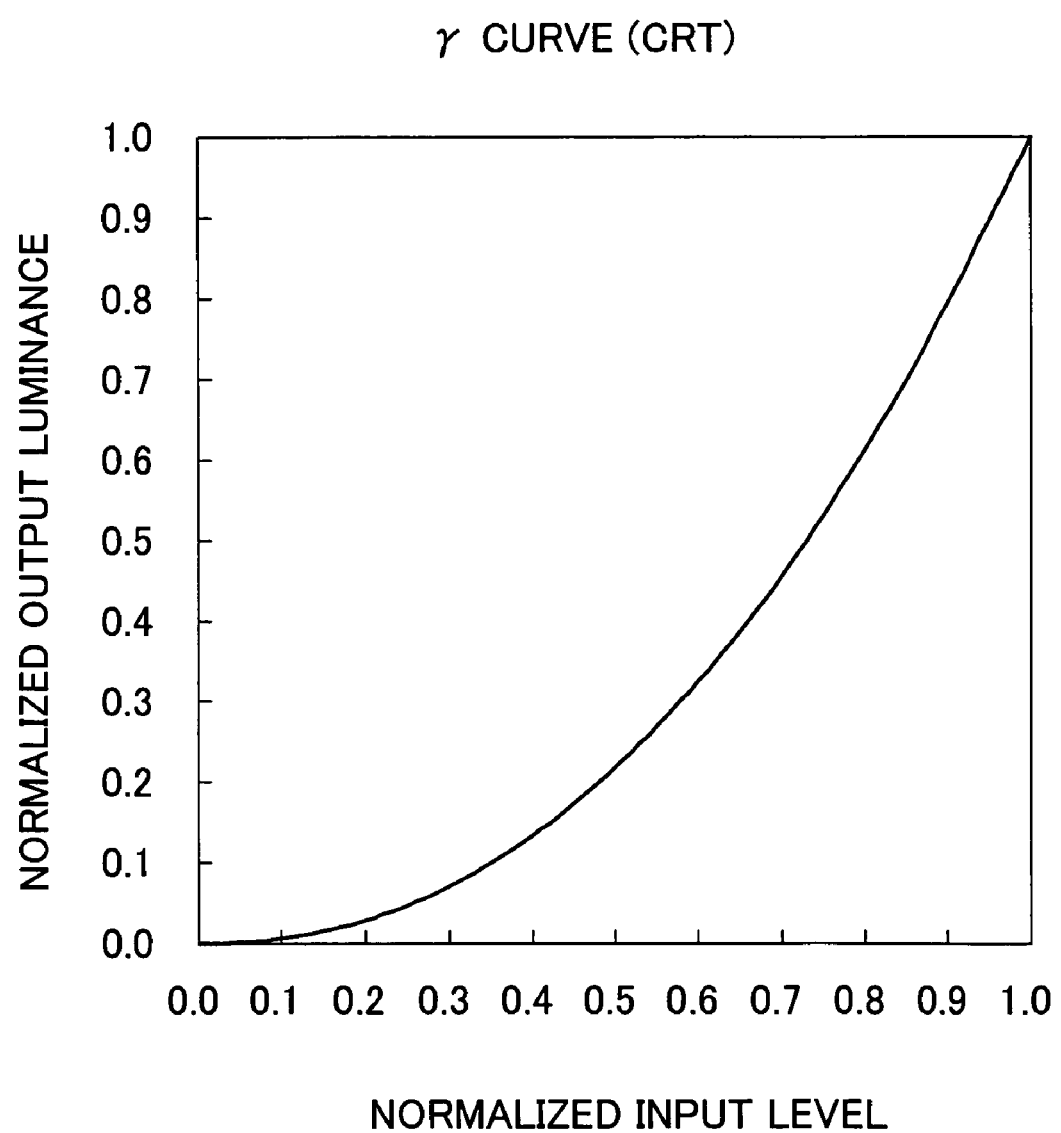
FIG. 13 shows an example of a γ curve in a general CRT (Cathode Ray Tube) device.

The following description will explain another embodiment of the present invention with reference to FIG. 11.

The examination device (display device examination device) 18 of the present embodiment, as shown in FIG. 11, examines the liquid crystal display device 1 described in Embodiment 1. Note that, FIG. 11 shows the correction circuit 3, the source driver 4, and the liquid crystal panel 6 and does not show the timing controller 2 and the gate driver 5 of the liquid crystal display device 1 shown in FIG. 1 so as to simplify the drawing. Further, illustration of the gradation interpolation circuit 11 of the correction circuit 3 is also omitted.

The examination device 18 includes a parameter calculating section 19, an examination pattern signal generator 20, and a luminance measuring device 21.

The parameter calculating section 19 calculates a parameter of the sigmoid function used to approximate the characteristic (V-T curve) of the liquid crystal panel 6 so as to set the parameter with respect to the sigmoid inverse function generator 10 in the liquid crystal display device 1.

Further, in the parameter calculating section 19 of the examination device 18, a target luminance curve, such as the γ characteristic, is set from the outside in advance. The parameter calculating section 19 outputs thus set γ characteristic to the γ conversion circuit 9 of the liquid crystal display device 1. In order to simplify the examination, ordinary setting is γ=1.0.

The examination pattern signal generator 20 generates RGB signals used to perform the examination, and outputs the RGB signals to the γ conversion circuit 9 of the correction circuit 3 of the liquid crystal display device 1. The RGB signals used to perform the examination may be generated in accordance with the target luminance curve that is set with respect to the parameter calculating section 19.

The luminance measuring device 21 measures the luminance in displaying an image in the liquid crystal panel 6. The luminance measuring device 21 outputs the measurement result to the parameter calculating section 19.

In such arrangement, the liquid crystal display device 1 examined by the examination device 18 corrects RGB signals inputted from the examination pattern signal generator 20 to the γ conversion circuit 9 in accordance with the parameters σ and $x_0$ inputted to the sigmoid inverse function generator 10, so that the liquid crystal panel 6 displays an image based on the RGB signals via the source driver 4.

While, the parameter calculating section 19 of the examination device 18 sets initial values of the parameters, used to perform the approximation in accordance with the characteristic of the liquid crystal panel, with respect to the sigmoid inverse function generator 10 of the correction circuit 3 of the liquid crystal display device 1. With respect to the liquid crystal display device 1 using the expression 1 in Embodiment 1, the parameters σ and $x_0$ are set. Here, the initial values of the set parameters may be calculated in accordance with a predetermined expression, or may be selected from a predetermined range in a random order.

Further, the parameter calculating section 19 of the examination device 18 estimates (judges) accuracy in the approximation based on the initial values of the set parameters, in accordance with the data measured by the luminance measuring device 21. Further, the parameter calculating section 19 calculates the parameter as follows in accordance with the measured data. For example, when the sufficient accuracy is obtained, the initial values of the parameters that have been set with respect to the sigmoid inverse function generator 10 are regarded as desired parameters. In contrast, when the sufficient accuracy is not obtained, new parameters are calculated in accordance with the initial values of the set parameters and the measurement result (data measured by the luminance measuring device 21). The calculation may be performed in accordance with a predetermined expression, or may be selected from a predetermined range in a random order.

The parameter calculating section 19 outputs the newly calculated parameters to the sigmoid inverse function generator 10 of the correction circuit 3 of the liquid crystal display device 1, so as to reset the parameters. Further, until the parameters set with respect to the sigmoid inverse function generator 10 reaches the desired values, the parameter calculating section 19 repeatedly calculates the parameters and repeatedly outputs the calculated parameters to the sigmoid inverse function generator 10. In this manner, the accuracy in performing the approximation based on the parameters is estimated.

That is, the examination device 18 causes the parameter calculating section 19 to repeatedly calculate the parameters until the accuracy in the approximation reaches the desired value.

For example, when γ32 1.0 is set with respect to the γ conversion circuit 9 (when the γ conversion circuit 9 does not process the signal passing therethrough) as described above, it may be so arranged that the parameter calculating section 19 calculates the parameters $x_0$ and σ so that the display in the liquid crystal panel 6 is such that γ=1.0 (the input level and the output luminance are in proportion to each other).

For example, it may be so arranged that: the γ conversion circuit 9 is set so as not to process the signal passing therethrough, and the parameters $x_0$ and σ so that also the sigmoid inverse function generator 10 is temporarily set so as not to process the signal passing therethrough, and the luminance characteristic of the liquid crystal panel 6 is temporarily measured by the luminance measuring device 21. Further, as to the measured luminance characteristic, the parameters $x_0$ and σ may be determined by using a least squares method for example.

As described above, the examination device 18 includes (i) the parameter calculating section 19 for setting the parameters with respect to the sigmoid inverse function generator 10 and (ii) the luminance measuring device 21 for measuring the luminance of the liquid crystal panel 6, and the parameter calculating section 19 calculates the parameters in accordance with the measurement result given by the luminance measuring device 21.

Thus, it is possible to obtain the parameter with the desired accuracy by resetting the parameter as required for example.

By using the examination device 18, it is possible to examine the liquid crystal display device 1 after assembling the liquid crystal display device 1 in a factory for example, thereby setting appropriate parameters σ and $x_0$ in the liquid crystal display device 1.

Further, in order to realize the desired luminance characteristic (luminance curve), the user may examine the liquid crystal display device 1 by using the examination device 18 for example. The user may set the obtained parameters σ0 and $x_0$ in the liquid crystal display device 1.

Note that, the examination device 18 may be realized by a program carried out by a computer. That is, the parameter calculating section 19 and the examination pattern signal generator 20 may be realized by a computer, and the luminance measuring device 21 may be realized by a program which causes a measuring device connected to the computer to function.

Further, the aforementioned embodiment describes the arrangement in which the examination device 18 examines the liquid crystal display device 1, but the present invention is not limited to this.

The examination device according to the present invention may be arranged so as to examine not whole the liquid crystal display device 1 but merely the liquid crystal panel 6. In this arrangement, the examination device includes not only the parameter calculating section 19, the examination pattern signal generator 20, and the luminance measuring device 21, but also the correction circuit 3 and the source driver 4 and the like. Further, the video data corrected in accordance with the set target luminance curve is inputted from the source driver 4 to the liquid crystal panel 6. Further, the examination device causes the luminance measuring device 21 to perform measurement, and trial is performed until an appropriate parameter is obtained. In this case, thus obtained appropriate parameter is set with respect to the liquid crystal display device assembled by using the aforementioned liquid crystal panel 6. The liquid crystal display device may include the sigmoid inverse function generator 10 using the DSP shown in FIG. 2, or may include the sigmoid inverse function generator 10a using the LUT shown in FIG. 8, or may include the LUT 14 shown in FIG. 9.

As described above, the present invention relates to the correction of the video signal of the liquid crystal display device, and is applied to (i) the correction in accordance with the applied voltage-transmittance characteristic of the liquid crystal, (ii) the $\gamma$ correction for adjusting the $\gamma$ characteristic between the imaging system and the display system, and (iii) the gradation correction for creating a picture in accordance with the display content, and the like.

The input voltage level-output luminance characteristic (applied voltage-transmittance curve) of the liquid crystal is different from that of a CRT device (television or the like which includes a CRT) which is a most general image display device. Thus, in the liquid crystal display device, the input signal level may be corrected so as to perform the same gradation display as in the CRT device.

In order to solve such problem, the conventional liquid crystal display device causes a driver and a power source circuit that are internally provided to perform an analog process. In the analog process, the accuracy in the correction tends to be varied depending on unevenness of the elements such as the driver and the power source circuit. Thus, it is difficult to perform adjustment.

More specifically, this disadvantage is as follows. For example, in a TFT (thin Film Transistor) liquid crystal display device, a transistor is provided on an intersection pixel in which a column electrode (source bus line) and a row electrode (gate bus line) cross each other. Further, a gate pulse is supplied to the transistor via the column electrode connected to the gate side of the transistor so as to turn ON/OFF the transistor.

In displaying an image, an electric charge is supplied from the row electrode, connected to the source side of the transistor, to a capacitor and liquid crystal that are formed on the pixel so as to be stored therein when each pixel transistor is ON (one horizontal period). This condition is kept for one frame period, so that a predetermined driving voltage is applied to the liquid crystal positioned in the intersection pixel, thereby displaying an image. When the liquid crystal display device displays a halftone image, a half voltage between an ON-voltage and an OFF-voltage of the display element is applied from the row electrode driving circuit of the source driver.

Here, a method in which the source driver of the liquid crystal display device generates the half voltage is represented by an analog system and a DAC (Digital to Analog Converter) system.

The analog system is such that: after literally sampling and holding an analog voltage inputted to the source driver, the analog voltage is shifted to a liquid crystal driving voltage, so as to be outputted. In order to display an image subjected to the $\gamma$ correction, the input level may be modulated by means of an analog circuit positioned inside or outside the source driver.

In the DAC system, a digital signal is supplied to the source driver as the input level, and the signal is converted into the liquid crystal driving voltage by means of the DAC positioned inside the source driver. In order to display an image subjected to the $\gamma$ correction, the reference voltage applied to the DAC may be optimized so as to correspond to the corrected value. The reference voltage is generated by dividing an external voltage with resistance generated inside the source driver. In this manner, the reference voltage is determined by a divisional ratio, so that the divisional ratio of the resistance in accordance with the characteristic of the target liquid crystal may be optimized so as to perform the most appropriate correction.

As described above, in the conventional methods, there are a large number of analog factors in correcting the voltage. Further, the parameters of the driver and the power source circuit may be redesigned every time the characteristic of the liquid crystal is varied. Further, the variation of the characteristic of the liquid crystal may result in deterioration of the display quality.

While, the liquid crystal display device 1 according to the present invention is arranged so that the source driver does not perform the correction as described above. Further, in the source driver 4, the voltage is equally divided by the power source circuit 7. Thus, it is easy to design the source driver 4. Further, it is possible to simplify the structure of the source driver 4. Thus, it is possible to eliminate the analog factors used in the conventional techniques from the source driver 4. This arrangement can be expressed as follows: the correction circuit 3 for performing the $\gamma$ correction is provided outside the source driver 4 which functions as the driving device, thereby simplifying the structure thereof.

Further, as a conventional technique, there is known a digital signal processing system in which the LUT or the like is used to perform the correction unlike the aforementioned analog technique. For example, Japanese Unexamined Patent Publication No. 288468/1997 (Tokukaihei 9-288468) and Japanese Unexamined Patent Publication No. 296149/1999 (Tokukaihei 11-296149) disclose such method that: an inputted video signal is converted by an external LUT in a digital manner and neither driver nor the power source perform the correction.

In such technique, the applied voltage-transmittance curve of the liquid crystal is approximated on the basis of a function, thereby performing the correction. However, in the conventional technique, such a complicate process that the applied voltage-transmittance is divided and approximated may be performed so as to perform highly accurate approximation on the basis of functions.

More specifically, in the approximation of the conventional technique, the characteristic is divided into sections so as to be approximated, so that the continuity of divisional points may be considered and the points at which the curve should be divided may be determined, so that this arrangement requires much trouble. Further, since the curve is divided into several sections, a large number of approximate expressions corresponding to the sections are required, so that the number of parameters given to the approximate expressions increases. This requires longer time to perform calculation thereof. For example, in Tokukaihei 11-296149, the curve is divided into five sections, so that five approximate expressions are required. Further, the accuracy in the γ correction drops. The curve may be divided into more sections in a fine manner so as to improve the accuracy in the γ correction. This requires further trouble and time taken to perform the calculation.

As described above, the conventional technique does not have such recognition that: in performing the approximation of the input/output characteristic of the display panel on the basis of functions, when the characteristic is divided into sections and the sections are approximated, the number of parameters increases, so that the trouble and the time that are taken to perform the calculation are increased. Thus, there is no attention paid to such object that the approximation is performed without dividing the characteristic into sections.

Then, in the present invention, a monotonically increasing function, referred to as a sigmoid function, which has a saturation characteristic, is used so as to approximate the applied voltage-transmittance curve of the liquid crystal. The sigmoid function enables a single function expression to approximate the transmittance curve of the liquid crystal without dividing the curve into approximate sections in accordance with the input levels. Further, the sigmoid function is capable of approximating the applied voltage-transmittance curve of the liquid crystal with a smaller number of parameters. Thus, it is possible to shorten the time taken to perform the calculation. Further, it is possible to correct the input signal level-output luminance characteristic of the display device with high accuracy by using an inverse function of the sigmoid function obtained by performing the approximation.

Further, it is so arranged that the correction circuit 3 is not provided inside the source driver 4. Data inputted to the liquid crystal display device 1 is corrected by the correction circuit 3 in accordance with the characteristic of the liquid crystal panel 6 and is outputted to the source driver 4. Thus, it is not necessary to change the source driver 4 regardless of whether the liquid crystal panel 6 is changed or not.

The display device conversion device according to the present invention, which converts a video signal inputted to a display device so as to output the video signal to a display panel, converts the video signal by using an inverse function of a single function obtained by approximating an input/output characteristic indicative of a relationship between an input to the display panel and a display output of the display panel.

The display device conversion device converts a video signal so as to correspond to a characteristic of the display panel, and outputs the converted video signal to the display panel. The video signal is converted by using an inverse function obtained by approximating the input/output characteristic of the display panel. Note that, the inverse function means a function obtained by replacing the input and the output with each other.

Here, the input/output characteristic of the display panel indicates a relationship between the input to the display panel and the display output of the display panel. The input/output characteristic corresponds to a relationship (V-T curve) between a voltage (input) applied to the liquid crystal panel and a transmittance of the liquid crystal panel in the case where the display panel is the liquid crystal panel. This is because that: since the display output of the liquid crystal panel is generated by causing light from the light source to be transmitted for example, luminance as the display output is in proportion to the transmittance.

In the display device conversion device, the input/output characteristic is approximated by a single function, and the approximate function is used to perform the approximation. Here, "to use a single function" means to use the same function with respect to whole the input signal without dividing the characteristic into sections.

Thus, in a display panel which displays an image based on a video signal that has passed through merely the display device conversion device, the display device conversion device converts the video signal by an inverse function, and the video signal is outputted in the display panel so as to correspond to the function obtained by performing the approximation. Thus, intensity of the video signal inputted to the display device and the display output are in proportion to each other.

Thus, when the display device conversion device is used, it is possible to realize a desired image characteristic regardless of the input/output characteristic of the display panel. For example, when a γ conversion circuit for obtaining a γ characteristic is further provided, it is possible to realize a desired γ characteristic in the display panel.

Further, the display device conversion device approximates the input/output characteristic by a single function, and uses an inverse function of the single function. Thus, in approximating the input/output characteristic, it is not necessary to divide the characteristic into sections for example.

Here, a conventional display device conversion device divides the characteristic into sections, and performs the approximation by using functions different from each other for the respective sections. Thus, not only the accuracy in the approximation but also the sequentiality and the continuity of the divisional points may be considered. This is because human perception is sensitive to the sequentiality and the continuity of variation in the gradation.

While, in the display device conversion device according to the present invention, a single unction is used, so that it is not necessary to consider the sequentiality and the continuity of the divisional points. Thus, it is possible to simplify the calculation.

Note that, as to the conversion function, it is possible to adopt any method for approximating the input/output characteristic by using a function. For example, it may be so arranged that: a parameter is included in the function, and the parameter is varied so as to perform the approximation. Alternatively, it may be so arranged that: the parameter is set by using a calculating section for performing calculation in accordance with a method such as a least squares method. Alternatively, it may be so arranged that: an operator installs a parameter setting section for setting a parameter so that the operator sets the parameter.

Further, it is possible to adopt any method for calculating an inverse function of a function obtained by performing the approximation.

In order to solve the foregoing problems, in addition to the foregoing arrangement, the display device conversion device according to the present invention is arranged so that the single function is a sigmoid function which is a monotonically increasing function having a saturation characteristic.

The sigmoid function is an example of the monotonically increasing function having a saturation characteristic.

Here, the saturation characteristic is such characteristic that: as to function y=f(x), when x is set to +∞ (−∞), y converges to a certain value. That is, due to the saturation characteristic, when the input is +∞ (−∞), y converges to a constant value, and the function is monotonously increasing during this time, so that the output of the function is S-shaped. Note that, the function has an inflection point which causes a quadric derivative of the function to be 0. Further, a linear derivative of the function is 0 when the input is +∞ (−∞), and the function has a finite value around the inflection point.

Thus, when the sigmoid function is used, it is possible to easily approximate an S-shaped input/output characteristic of the display panel in accordance with a single sigmoid function. Note that, the arrangement is not limited to the liquid crystal panel. As long as it is possible to obtain the S-shaped input/output characteristic, any display panel can be preferably used.

Further, the sigmoid function is sequential and differentiable from a minimum level to a maximum level of the video signal. Further, the sigmoid function is differentiable in whole the range, and monotonically increases, and has boundedness.

Further, the sigmoid function represented by the S-shaped curve includes two parameters: a position of an inflection point and a slope of the inflection point. Thus, it is possible to perform the approximation in accordance with the two parameters. Thus, compared with a case of performing the approximation by using a high order (second or further order) polynomial expression, it is possible to reduce the number of parameters used to perform the approximation. Further, it is possible to shorten the calculation time required in performing the approximation. Further, an originally-S-shaped curve (input/output characteristic) is approximated by an S-shaped function, so that it is possible to improve the accuracy in performing the approximation. Note that, the number of parameters used in performing the approximation is not limited to two, but it is possible to use three or more parameters in performing the approximation.

Note that, examples of the sigmoid function include arctan function ($\tan^{-1}$ function), $1/[1+\exp\{-(x-a)/b\}]$, and $[1+\tan h\{x-a)/b\}]/2$. The parameters a and b are set as required so as to correspond to the input/output characteristic of the target display panel such as the liquid crystal panel. Thus, for example, in the liquid crystal panel, the applied voltage-transmittance characteristic curve (V-T curve) indicative of a relationship between (i) a liquid crystal's voltage applied from a driving circuit to a liquid crystal element and (ii) the transmittance is approximated.

Further, in performing the approximation, an input range and an output range of the input/output characteristic are finite, so that it is possible to use the function obtained by performing the approximation after normalizing it so that its maximum value is 1 and its minimum value is 0.

Note that, it is possible to express the foregoing arrangement as a sigmoid inverse function generator which approximates the applied voltage-transmittance characteristic curve (V-T curve), indicative of a relationship between (i) a liquid crystal's voltage applied from the driving circuit to the liquid crystal element and (ii) the transmittance, by the sigmoid function, so as to convert a level of the input signal into an optical response of a desired γ characteristic by using an inverse function of the approximated V-T curve.

In order to solve the foregoing problems, in addition to the foregoing arrangement, the display device conversion device according to the present invention is arranged so as to include a storage element for storing the inverse function of the sigmoid function as a conversion table.

Here, the conversion table is a so-called LUT (Look Up Table), and retains a relationship between an input and an output as a table.

The display device conversion device causes the storage element to store the inverse function of the sigmoid function as the conversion table. When an input data signal is given to an address input, the storage element outputs corresponding data that has been written in advance.

When the calculation result that has been made is stored in advance, it is possible to omit the trouble taken to perform the calculation. Further, the time taken to perform the calculation is not required, so that it is possible to shorten the processing time.

It may be so arranged that: for example, there are provided storage elements respectively corresponding to colors of RGB, and video signals are inputted to the storage elements so as to respectively correspond to the colors.

Further, as the storage element, it is possible to use a ROM (Read Only Memory), EEPROM (Electrical Erasable Programable Read Only Memory), a nonvolatile RAM (feroelectric memory or the like) etc.

Note that, it is also possible to express the arrangement as follows: an inverse function derived from the approximation performed with respect to the V-T curve of the liquid crystal on the basis of the sigmoid function is stored in the LUT.

In order to solve the foregoing problems, the display device conversion device is arranged so that the storage element is rewritable.

According to the arrangement, the storage element is rewritable, so that it is possible to rewrite the conversion table. Thus, even when the input/output characteristic of the display panel such as the liquid crystal panel varies for example, it is possible to cover the variation.

Example of the rewritable storage element include EEPROM, and a nonvolatile RAM (feroelectric memory or the like).

Note that, it is also possible to express the arrangement as follows: the LUT is rewritable so as to correspond to the V-T curve of the target liquid crystal panel.

In order to solve the foregoing problems, in addition to the foregoing arrangement, the display device conversion device according to the present invention is arranged so that the sigmoid function includes three or more parameters.

The sigmoid function represented by the S-shaped curve includes two parameters: a position of an inflection point and a slope of the inflection point.

When parameters are further added and the approximation is performed by using three or more parameters, it is possible to perform more exact approximation.

Note that, it is also possible to express the arrangement as an inverse function generator for performing calculation by using three or more parameters so as to determine the sigmoid function.

In order to solve the foregoing problems, the display device correction circuit according to the present invention, which corrects a video signal inputted to a display device so as to output the video signal to a display panel, comprising: a γ conversion circuit for converting the video signal so that the video signal has a desired γ characteristic; and a display device conversion device for converting the video signal by using an inverse function of a single function obtained by approximating an input/output characteristic indicative of a relationship between an input to the display panel and a display output of the display panel.

The display device correction circuit includes the display device conversion device for performing conversion by using an inverse function of a function obtained by approximating the input/output characteristic of the display panel. When merely the display device conversion device is used to cause the display panel to display an image based on the video signal that has passed through merely the display device conversion device, intensity of the video signal inputted to the display device and the display output of the display panel are in proportion to each other.

Note that, the display device conversion device may be arranged so that the single function used to perform the approximation is a sigmoid function. The sigmoid function may include three or more parameters. Further, the display device conversion device may include a storage element for storing the inverse function as a conversion table. The storage element may be rewritable. Further, the display device may be a liquid crystal display device which has a liquid crystal panel as a display panel.

The display device correction circuit further includes a γ conversion circuit for converting the inputted video signal so as to have a desired γ characteristic, so that it is possible to realize the γ characteristic with high accuracy.

More specifically, for example, the video signal inputted to the display device is subjected to γ conversion by means of the γ conversion circuit of the display device correction circuit, and is inputted to the display device conversion device. Here, the γ conversion means to convert input data x into output data $y=x^\gamma$. Further, the γ conversion may be such that normalized input data X is converted into normalized output data $Y=X^\gamma$.

The γ value may be set to 1 for example, or may be set to a desired value of γ=approximately 1.8 to 2.4. Further, the γ value may be set in advance, or may be set by a γ setting circuit in accordance with the inputted video signal, or may be arbitrarily set by an operator using an operating section.

An output of the γ conversion circuit is inputted to the display device conversion device, and the display device conversion device converts the output by using an inverse function of the single function. The display panel has the same output characteristic as in the function obtained by performing the approximation, so that the intensity of the video signal inputted to the display device and the display output of the display panel have a γ characteristic set by the γ conversion circuit. In this manner, when the display device correction circuit arranged in the foregoing manner is used, it is possible to realize the desired γ characteristic regardless of the input/output characteristic of the display panel.

Further, the display device conversion device uses an inverse function of the single function, so that it is possible to reduce the number of parameters, and it is possible to shorten the time taken to perform the calculation. Further, the characteristic is not divided, so that it is possible to perform the γ correction with high accuracy.

Note that, in the foregoing arrangement, as described above, it may be so arranged that the display device conversion device performs the conversion after the γ conversion circuit performs the conversion. Alternatively, as long as it is possible to obtain the sufficient accuracy, it may be so arranged that: first, the display device conversion device converts the video signal inputted to the display device, and thereafter, the γ conversion circuit performs the conversion.

Further, in the foregoing arrangement, it may be so arranged that the display device conversion device and the γ conversion circuit are integrally provided. That is, the display device correction circuit may be arranged so as to process the inputted video signal at once by using a composite function constituted of (i) a function for performing the γ conversion and (ii) the inverse function of the display device conversion device. According to the arrangement, it is possible to shorten the time taken to perform the calculation in the display device correction circuit.

Further, it may be so arranged that at least either the display device conversion device or the γ conversion circuit is stored in the storage element as a conversion table.

In order to solve the foregoing problems, in addition to the foregoing arrangement, the display device correction circuit according to the present invention includes a state amount calculation setting circuit for calculating a state amount of an image displayed by the video signal, in accordance with the video signal, so as to set the γ characteristic of the γ conversion circuit in accordance with the state amount.

Here, the state amount of the video signal is luminance distribution in a certain single image for example. In the luminance distribution, it is possible to determine a type of the video signal by using an average luminance and dispersion of the luminance in each pixel for example. For example, it may be so arranged that: whether the video signal contains a large amount of halftone (half gradation) or not is determined, or whether the video signal contains little half tone or not is determined.

The state amount calculation setting circuit sets the desired γ characteristic, based on the determination result, with respect to the γ conversion circuit. For example, it may be so arranged that: the γ conversion circuit sets the γ value to be small as to the video signal containing a large amount of half tone, and sets the γ value to be large as to the video signal containing little half tone.

According to the arrangement, it is possible to preferably display an image corresponding to the characteristic of the video signal.

Note that, the state amount used by the state amount calculation setting circuit is not limited to the luminance distribution, but it is possible to another amount.

In order to solve the foregoing problems, the display device correction circuit according to the present invention, which corrects a video signal inputted to a display device so as to output the video signal to a display panel, comprising: a gradation resolution increasing section for increasing gradation resolution of the video signal; and a display device conversion device for converting an output from the gradation resolution increasing section by using an inverse function of a single function obtained by approximating an input/output characteristic indicative of a relationship between an input to the display panel and a display output of the display panel.

According to the arrangement, the gradation resolution increasing section increases the gradation resolution of the video signal inputted to the display device correction circuit, and the display device conversion device converts the output from the gradation resolution increasing section, so that it is possible to improve the accuracy in the conversion performed by the display device conversion device. Further, it is possible to display an image corresponding to the accuracy.

Note that, the gradation resolution increasing section may be the γ conversion circuit for performing the γ conversion for example. Further, the conversion performed by the display device conversion device may be performed to increase the gradation resolution or may be performed to decrease the gradation resolution.

In order to solve the foregoing problems, in addition to the foregoing arrangement, the display device correction circuit according to the present invention includes a gradation interpolation circuit for (i) decreasing gradation resolution of an output from the display device conversion device and (ii) interpolating gradation by performing time-series calculation or area coverage modulation.

Here, the time-series calculation process for interpolating the gradation is FRC (Frame Rate Control) for example. Further, the area coverage modulation is dither or an error diffusion method for example.

The gradation interpolation circuit decreases the gradation resolution of the output from the display device conversion device so as to adjust the gradation resolution to gradation resolution of the display panel. That is, the gradation resolution increasing section increases the gradation resolution of the video signal, so that the gradation resolution is decreased so as to correspond to the gradation resolution of the display panel.

Further, the gradation interpolation circuit interpolates the decreased gradation by performing the time-series calculation or the area coverage modulation. For example, in the time-series calculation process, in terms of human perception which percepts an average gradation of gradations displayed in a single image for a certain time, the number of apparent gradations is increased compared with the number of original gradations. Further, for example, in the area coverage modulation, in terms of the human perception which percepts an average gradation in an area containing a plurality of pixels, the number of apparent gradations is increased compared with the number of original gradations.

In this manner, the gradation is interpolated by using the gradation interpolation circuit, so that it is possible to express an image whose gradation is higher than the gradation of the display panel as an apparent gradation regardless of the gradation resolution of the display panel.

In order to solve the foregoing problems, the display device driving device according to the present invention, which generates a driving signal in accordance with a video signal inputted to a display device so as to output the driving signal to a display panel, generates an output signal to the display panel in accordance with an output from a display device conversion device for converting the video signal by using an inverse function of a single function obtained by approximating an input/output characteristic indicative of a relationship between an input to the display panel and a display output of the display panel.

Here, the display device driving device generates an output signal corresponding to a level of the inputted video signal, and outputs the output signal to the display panel. When the display device is a liquid crystal display device for example, the display device driving device corresponds to a source driver. The source driver generates a voltage corresponding to a level of the inputted video signal, and outputs the voltage to a liquid crystal panel.

The display device driving device generates an output signal to the display panel in accordance with the video signal, outputted from the display device conversion device, which has been corrected in consideration for the input/output characteristic of the display panel. Thus, it is not necessary that the driving device includes a structure which performs the correction in accordance with the input/output characteristic of the display panel, so that it is possible to simplify the arrangement of the display device driving device. For example, the display device driving device may be arranged so as to include: a row electrode driving circuit for outputting a driving signal which is in proportion to a level of an input signal; and a power source circuit for equally dividing a voltage difference between a reference signal which causes the liquid crystal to have a minimum display output and a reference signal which causes the liquid crystal to have a maximum display output.

Further, the display device driving device and the display device conversion device are separately provided, and the display device conversion device covers the variation of the input/output characteristic, so that it is not necessary to change the display device driving device.

Note that, it is also possible to express the foregoing arrangement as the display device driving device for receiving a signal outputted from the display device correction circuit so as to output a gradation voltage corresponding to the received signal.

In order to solve the foregoing problems, the display device according to the present invention causes a display panel to display an image based on an inputted video signal, wherein the display panel displays the image based on the video signal which has passed through a display device conversion device for converting the video signal by using an inverse function of a single function obtained by approximating an input/output characteristic indicative of a relationship between an input to the display panel and a display output of the display panel.

According to the arrangement, an image based on the signal which has passed through the conversion device is displayed in the display panel, so that it is possible to realize a desired image characteristic regardless of the input/output characteristic of the display panel. That is, when an image based on the signal which has passed through the display device conversion device is displayed in the display panel for example, the intensity of the video signal inputted to the display device and the display output of the display panel are proportion to each other. If the $\gamma$ conversion circuit for performing the $\gamma$ conversion is further provided for example, it is possible to realize the desired $\gamma$ characteristic in the display panel.

The display device may be a liquid crystal display device using a liquid crystal panel as the display panel.

Further, in the arrangement in which the display device conversion device uses the sigmoid function, it is possible to decrease the number of parameters used to perform the approximation, and it is possible to shorten the time taken to perform the calculation. Further, it is possible to improve the accuracy in the correction.

Further, the display device conversion device performs the correction in accordance with the display panel, so that it is possible to simplify the arrangement of the display device driving device for generating the driving signal to the display panel.

Note that, it is also possible to express the foregoing arrangement as follows: the display device includes: means for correcting an inputted video signal by using an inverse function generator which generates an inverse function of a sigmoid function obtained by approximating a transmittance curve of liquid crystal; a row electrode driving circuit for outputting a gradation display voltage applied to a liquid crystal pixel so as to supply electric charge which is in proportion to a level of an input signal; and a power source circuit for equally dividing a voltage difference between an applied voltage which causes the liquid crystal to have a minimum transmittance and an applied voltage which causes the liquid crystal to have a maximum transmittance so as to supply each of the voltages thus equally divided to the row electrode driving circuit.

In order to solve the foregoing problems, the display device examination device according to the present invention, which examines a display panel for displaying an image based on an inputted video signal, includes: a parameter calculating section for setting a parameter contained in a function used by a display device conversion device which converts the video signal by using an inverse function of a single function obtained by approximating an input/output characteristic indicative of a relationship between an input to the display panel and a display output of the display panel, so as to give the parameter to the display device conversion device; and a luminance measuring device for measuring luminance of the display panel which displays an image based on the video signal outputted from the display device conversion device, in accordance with the parameter set by the parameter calculating section, wherein the parameter calculating section calculates the parameter in accordance with a measurement result given by the luminance measuring device.

With respect to the display device conversion device, the parameter calculating section of the display device examination device sets an approximate parameter in a function obtained by approximating the input/output characteristic of the display panel. For example, when the function used by the display device conversion device is such sigmoid function that $G1(x)=1/[1+\exp\{-x-a)/b\}]$, parameters a, b ($0<a<1$, $0<b$) are respectively set. The display panel displays an image based on an output from the display device conversion device in accordance with the set parameter.

The luminance measuring section measures the luminance of an image displayed in the display panel. Further, the parameter calculating section calculates a parameter in accordance with a measurement result given by the luminance measuring section.

When it is impossible to obtain the desired accuracy for example, the parameter calculating section may reset the calculated parameter with respect to the display device conversion device in accordance with the measurement result given by the luminance measuring section. The luminance of an image displayed in the display panel in accordance with the aforementioned setting is measured again by the luminance measuring section, and the measurement result is outputted to the parameter calculating section.

According to the arrangement, it is possible to obtain the parameter, set with respect to the display device conversion device, with the desired accuracy.

Note that, in the foregoing arrangement, the display device examination device may include the display device conversion device. Alternatively, it may be so arranged that the display device conversion device is provided on the display panel so as to function as a display device.

In order to solve the foregoing problems, the display method according to the present invention, in which an image based on an inputted video signal is displayed, includes the step of converting the video signal in accordance with a monotonically increasing function, being sequential and differentiable from a minimum level to a maximum level of the video signal, which has a saturation characteristic.

In the display method, the video signal is converted by the foregoing step, and an image based on the converted video signal is displayed.

Here, the foregoing function is a monotonically increasing function having a saturation characteristic, so that the input/output characteristic based on the function is S-shaped. Thus, it is possible to easily approximate the input/output characteristic represented by the S-shaped curve.

In the foregoing arrangement, the conversion is performed by using an inverse function of a function obtained by performing the approximation. Thus, it is possible to realize desired display regardless of the input/output characteristic of the S-shaped curve.

The present invention is not limited to the aforementioned embodiments, and may be varied in many ways within a scope of the following claims. Embodiments obtained by combining technical means disclosed in different embodiments as required are included in the technical scope of the invention.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A display device conversion device, converting a video signal inputted to a display device so as to output the video signal to a display panel,
   wherein said conversion device converts the video signal by using an inverse function of a sigmoid function obtained by approximating an input/output characteristic indicative of a relationship between an input to the display panel and a display output of the display panel,
   wherein the sigmoid function is a monotonically increasing function having a saturation characteristic, and
   wherein the sigmoid function contains three or more parameters.

2. A display device correction circuit, which corrects a video signal inputted to a display device so as to output the video signal to a display panel, comprising:
   a γ conversion circuit for converting the video signal so that the video signal has a desired γ characteristic; and
   a display device conversion device for converting the video signal by using an inverse function of a sigmoid function obtained by approximating an input/output characteristic indicative of a relationship between an input to the display panel and a display output of the display panel, and
   a state amount calculation setting circuit for calculating a state amount of an image displayed by the video signal, in accordance with the video signal, so as to set the γ characteristic of the γ conversion circuit in accordance with the state amount.

3. The display device correction circuit as set forth in claim 2, wherein the state amount indicates dispersion and an average value of luminance in the image displayed in the display panel.

4. The display device correction circuit as set forth in claim 3, wherein
   the state amount calculation setting circuit includes: a luminance calculating section for calculating each pixel luminance of an image displayed in the display panel;
   an average calculating section for calculating average luminance of a single image by using said each pixel luminance;
   a dispersion calculating section for calculating dispersion of luminance of the single image by using said each pixel luminance; and
   data generating section for setting the y characteristic in accordance with the average luminance and the dispersion of the luminance.

* * * * *